(12) United States Patent
Jawahar et al.

(10) Patent No.: US 6,289,333 B1
(45) Date of Patent: Sep. 11, 2001

(54) METHODS AND APPARATUS ENABLING DYNAMIC RESOURCE COLLABORATION WHEN COLLABORATION SESSION HOST IS DISTINCT FROM RESOURCE HOST

(75) Inventors: Janardhanan Jawahar, San Jose; Venkatachari Dilip, Cupertino, both of CA (US)

(73) Assignee: Aspect Communications Corp., San Jose, CA (US)

( * ) Notice: Subject to any disclaimer, the term of this patent is extended or adjusted under 35 U.S.C. 154(b) by 0 days.

(21) Appl. No.: 09/196,892

(22) Filed: Nov. 20, 1998

Related U.S. Application Data

(63) Continuation-in-part of application No. 09/008,523, filed on Jan. 16, 1998, now abandoned.

(51) Int. Cl.$^7$ .................................................. G06F 17/30
(52) U.S. Cl. ............................... 707/2; 707/10; 707/513; 707/201; 711/113; 709/203
(58) Field of Search .................................. 707/2, 104, 10, 707/513, 201; 709/204, 206, 203; 711/113

(56) References Cited

U.S. PATENT DOCUMENTS

| | | | | |
|---|---|---|---|---|
| 5,991,796 | * | 11/1999 | Anupam et al. | 709/206 |
| 6,029,175 | * | 2/2000 | Chow et al. | 707/104 |
| 6,070,185 | * | 5/2000 | Anupam et al. | 709/204 |
| 6,112,279 | * | 8/2000 | Wang | 711/119 |

* cited by examiner

*Primary Examiner*—Jack Choules
*Assistant Examiner*—Cheryl Lewis
(74) *Attorney, Agent, or Firm*—Davis & Johnson, LLP; William D. Davis

(57) ABSTRACT

Methods and apparatus for enabling collaboration between clients with respect to dynamic resources are described. The method includes the step of establishing a collaboration session between a first client and a second client through a session host. A first client request having a first uniform resource locator (URL) identifying a host other than the session host is re-directed through the session host. In one embodiment, the retrieved resource is modified such that for each embedded request identifying a host other than the session host, its associated embedded URL is replaced with a re-directed URL incorporating the embedded URL. The re-directed URL re-directs the corresponding request for a resource identified by the embedded URL through the session host. In an alternative embodiment, the retrieved resource is not modified. In either embodiment, the resulting resource is cached if necessary (e.g., when the resource is dynamic). In one embodiment, an expiration date of the retrieved resource indicates whether the resource is dynamic. In another embodiment, the retrieved resource is presumed dynamic if the first client request includes at least one of a POST, PUT, DELETE, LINK, and an UNLINK hypertext transfer protocol (HTTP) command. The resulting resource is then provided to the first client. The second client is provided with a second URL that identifies either the requested resource or the cached resource depending upon whether caching was necessary.

20 Claims, 16 Drawing Sheets

| PAGE IDENTIFIER | INFORMATION CONTAINED IN PAGE | TIME VIEWED | INFORMATION TYPE |
|---|---|---|---|
| COMPSYSTEMS | ALL COMPUTERS | 2.5 | COMPUTER PRODUCTS |
| XL3000 | XL3000 GENERAL INFORMATION | 1.5 | XL3000 |
| XL2000 | XL2000 GENERAL INFORMATION | 2.0 | XL2000 |
| XL2000.HWSPEC | XL2000 HARDWARE SPECIFICATIONS | 3.0 | XL2000 |
| XL2000.SWBNDL | XL2000 BUNDLED SOFTWARE | 1.0 | XL2000 |
| XL2000.FAQ | XL2000 FREQ. ASKED QUESTIONS | 2.5 | XL2000 |
| XL2000.OPTIONS | XL2000 OPTIONAL ACCESSORIES | 1.5 | XL2000 |

FIG. 10

METHODS AND APPARATUS ENABLING DYNAMIC RESOURCE COLLABORATION WHEN COLLABORATION SESSION HOST IS DISTINCT FROM RESOURCE HOST

CROSS-REFERENCE TO RELATED APPLICATIONS

This application is a continuation-in-part of application Ser. No. 09/008,523, filed Jan. 16, 1998, abandoned.

FIELD OF THE INVENTION

The present invention relates to data communication. In particular, the invention is drawn to methods and apparatus to enable the monitoring of accessed information.

BACKGROUND

Systems are available that allow an individual to search for information and conduct transactions. For example, an individual may use a web browser application to search for information stored on web servers in the form of web pages. Additionally, a web browser application can be used to conduct transactions (such as bank transactions) across the Internet. Various other types of systems and applications may be used to search for information and conduct transactions.

When an individual is searching for specific information or executing a transaction, the web pages or other information sources may not provide the specific information desired by the individual. In this situation, the individual may continue searching other information sources using the same searching system or application. Alternatively, the individual may attempt to search for the desired information using a different searching system or application. For example, if the individual is unable to locate the desired information at a particular web site, the individual may try searching at a different web site or may try searching through product brochures for the desired information.

These existing systems typically provide minimal feedback to the source of the information (e.g., the organization responsible for the web server or web page) regarding the success or failure of the individual's search results. Generally, the individual does not have any options for assistance except by initiating a communication (such as a telephone call) to the organization responsible for the web page or by searching at another information source. If the individual contacts the organization responsible for the web server or web page, the representative of the organization will initially be unfamiliar with the information already obtained by the individual. Additionally, the representative will initially be unfamiliar with the number of web pages viewed and the time spent viewing each web page. Further, the representative that receives the telephone call may not have the required knowledge or expertise to provide the required information to the individual. In this situation, the individual may need to talk to another representative having the appropriate knowledge and expertise. This procedure can be tedious and time-consuming for the individual.

One method of tracking web server and other information source accesses involves logging the occurrence of an access and the identity of the resource accessed. If the resource is static, the representative has a record of which resources were accessed and can recreate the access in order to aid the individual, for example, by viewing the static results of the access while communicating with the individual. The representative may still have no information on the length of time or number of times that the static resource (e.g., a static web page) was visited. In the case of a dynamic resource (e.g., a dynamically generated web page) the representative is additionally unlikely to be able to recreate or analyze the accessed information.

SUMMARY OF THE INVENTION

Methods and apparatus for enabling collaboration between clients with respect to dynamic resources provided by hosts other than the session host responsible for the collaboration session are described.

In one embodiment, the method includes the step of establishing a collaboration session between a first client and a second client through a session host. A first client request having a first uniform resource locator (URL) identifying a host other than the session host is re-directed through the session host. The session host caches a retrieved resource provided from the other host in response to the re-directed request, if necessary. The retrieved resource is then provided to the first client. The second client is provided with a second URL. The second URL is the same as the first URL if the retrieved resource is not cached. The second URL identifies the cached resource, if the retrieved resource was cached.

In another embodiment the method includes the step of establishing a collaboration session between first and second clients with a session host. The session host retrieves a requested resource from a resource host in response to a first client request having a first URL identifying a resource host other than the session host. The retrieved resource is modified such that for each embedded request identifying a host other than the session host, its associated embedded URL is replaced with a re-directed URL incorporating the embedded URL. The re-directed URL re-directs the corresponding request for a resource identified by the embedded URL through the session host. The modified resource may then be cached if necessary. The modified resource is then provided to the first client. A second URL is provided to the second client. The second URL identifies one of the requested resource or the cached modified resource depending upon whether the modified resource was cached.

BRIEF DESCRIPTION OF THE DRAWINGS

The present invention is illustrated by way of example in the following drawings in which like references indicate similar elements. The following drawings disclose various embodiments of the present invention for purposes of illustration only and are not intended to limit the scope of the invention.

FIG. 10 illustrates an embodiment of a table containing information relating to web pages accessed by a user.

DETAILED DESCRIPTION

The following detailed description sets forth numerous specific details o provide a thorough understanding of the invention. However, those of ordinary skill in the art will appreciate that the invention may be practiced without these specific details. In other instances, well-known methods, procedures, protocols, components, algorithms, and circuits have not been described in detail so as not to obscure the invention.

The present description is related to a system capable of monitoring an individual's access to information contained in a web server or other information storage mechanism. Various embodiments also provide a system that selectively displays an assistance icon to an individual. The assistance icon provides the individual with an opportunity to request assistance from an agent or other individual associated with the information being viewed by the individual. By monitoring an individual's access to information, the source of the information is able to determine whether to offer help to the individual. If the individual is offered help, and requests help, the prior information accessed by the individual can be used to select an agent to assist the individual. The teachings can be used with any type of system in which an agent or other representative is able to communicate with a customer or other individual or system.

Particular embodiments are described below as used in a transaction processing environment. However, the teachings may be used in any data communication environment and with any type of data communication system. The embodiments described below communicate information (such as web page information) across a network. In alternate embodiments, the teachings may be applied to the communication of other types of information across other types of communication links.

Exemplary transactions in a transaction processing environment include telephone calls, facsimile transmissions, electronic mail (e-mail), video sessions, or network sessions (such as an Internet session). A particular transaction can be either inbound (e.g., received by a transaction processing system) or outbound (e.g., transmitted from a transaction processing system).

A transaction processing system is any device capable of receiving, transmitting, queuing, routing, or otherwise processing a transaction. A transaction processing system may also handle mixed transactions (e.g., receive a telephone call and respond to the telephone call using e-mail). Example transaction processing systems include automatic call distributors (ACDs), call centers, and other telephone call processing devices. The teachings of the present invention may be used with any type of transaction processing system.

Figure 1:
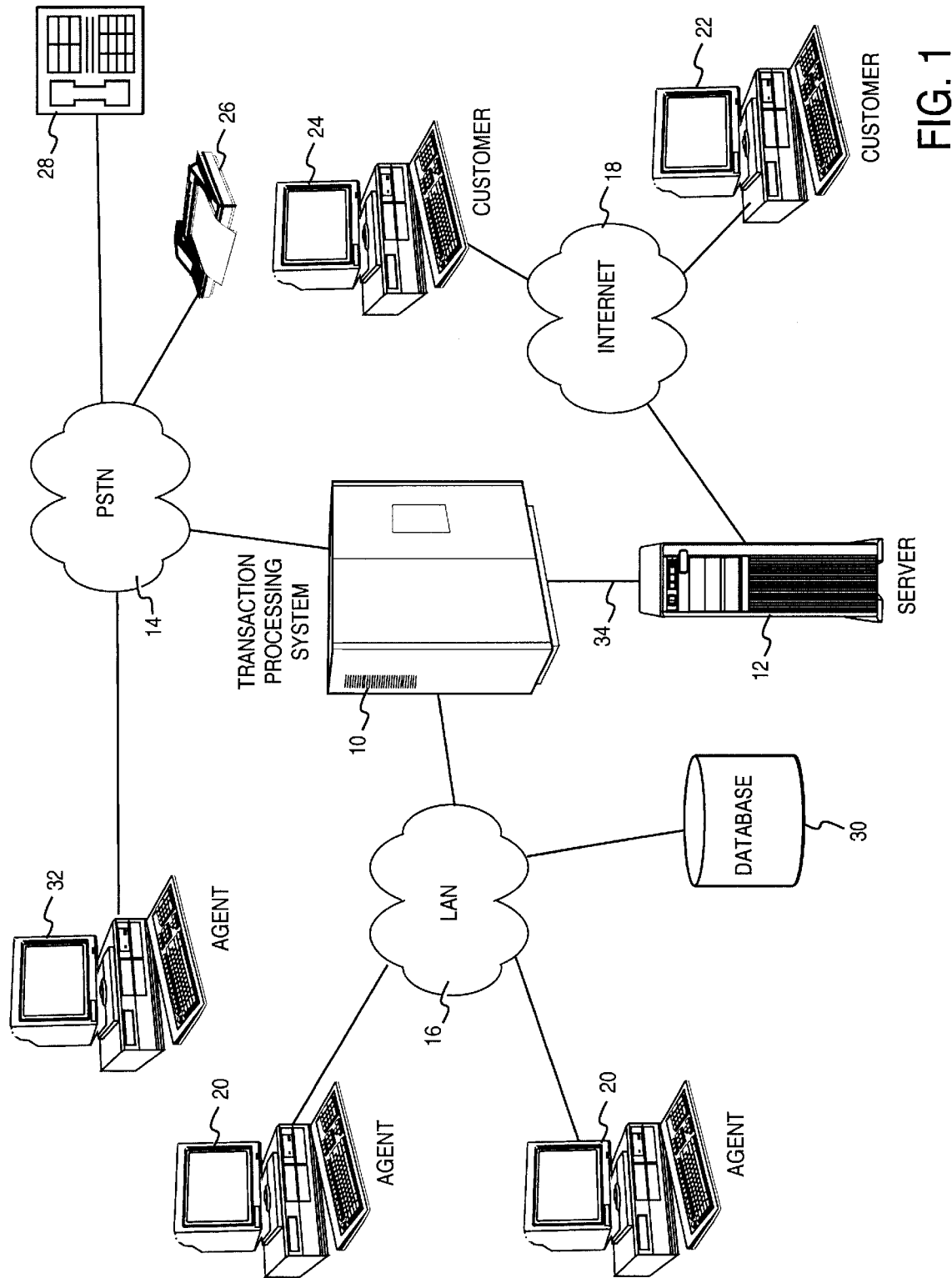
FIG. 1 illustrates an embodiment of a transaction processing environment in which the present invention may be used.

FIG. 1 illustrates an embodiment of a transaction processing environment in which the present invention may be used. The transaction processing environment of FIG. 1 allows transaction initiators (e.g., customers) to contact an agent (e.g., a customer service agent) using various types of transactions. Similarly, the transaction processing environment allows an agent to respond to a received transaction (e.g., received from a customer) or initiate a new transaction.

A transaction processing system 10 is coupled to a server 12, a public switched telephone network (PSTN) 14 and a local area network (LAN) 16. Transaction processing system 10 is capable of processing various types of transactions, such as telephone calls, electronic mail (e-mail), voice mail, and facsimiles. Transaction processing system 10 is capable of receiving transactions from PSTN 14, LAN 16, and server 12. Similarly, transaction processing system 10 is capable of transmitting transactions to PSTN 14, LAN16, and server 12. For example, transaction processing system 10 can receive an incoming telephone call directly via PSTN 14. Another incoming telephone call may be received by server 12 (e.g., an Internet telephone call received across Internet 18) and provided to transaction processing system 10 across a communication link 34 or across LAN 16. In other situations, transaction processing system 10 may receive an incoming e-mail from server 12 or LAN 16.

FIG. 1 illustrates a single server 12 capable of interacting with various components in the transaction processing environment. For example, server 12 may operate as a web server, an e-mail server, a fax server, and a video server. Additionally, server 12 can perform the functions of a control server, as discussed below. In alternate embodiments of the invention, the transaction processing environment may include multiple servers, in which each server is responsible for one or more types of transactions. For example, a web server processes all web-based transactions, an e-mail/fax server processes all e-mail and facsimile transactions, and a control server controls and manages various transactions and communication sessions in the transaction processing environment.

LAN 16 can be any type of network, including an intranet network, capable of communicating information between various nodes in the network. Further, LAN 16 may use any network topology and communicate data using any communication protocol. As shown in FIG. 1, multiple agents 20 are coupled to LAN 16. In a typical transaction processing environment, hundreds or thousands of agents may be coupled to one or more LANs 16, which are coupled to transaction processing system 10. Alternatively, some or all of the agents 20 may be coupled directly to transaction processing system 10, rather than coupled through LAN 16. Although agents 20 are represented in FIG. 1 by a computer, a particular agent 20 may utilize any type of device or system that allows interaction between the agent and another person or device (such as a customer or a customer's computer). For example, an agent handling only telephone call transactions may only use a telephone system, without requiring a computer. Similarly, an agent handling only e-mail messages may require a computer system, but not a telephone. In a particular embodiment of the invention, each agent has a computer system and a telephone (which may be integrated into the computer system), such that the agent is capable of handling and responding to multiple types of transactions (e.g., telephone calls, e-mail, voice mail, and facsimiles).

An agent 32 is not coupled to LAN 16, but instead is coupled to PSTN 14. Agents 20, discussed above, are located locally to transaction processing system 10 or include an access mechanism allowing agents 20 to establish a connection to LAN 16. Agent 32 is a remote agent or otherwise unable to directly connect to LAN 16. For example, agent 32 may be working at a location geographically distant from transaction processing system 10, such as working at home or traveling. Agent 32 establishes a connection with transaction processing system 10 across PSTN 14. Alternatively, agent 32 may connect with LAN 16 or transaction processing system 10 through Internet 18 or any other network or communication system.

A database 30 is coupled to LAN 16 and is used by transaction processing system 10, agents 20 and 32, and server 12 to store and retrieve various types of information. For example, database 30 may contain information about the transaction processing system, the performance of the system, and the agents and customers that use transaction processing system 10. Since database 30 is coupled to LAN 16, all agent computers, servers, and other devices coupled to LAN 16 are capable of storing and retrieving information from the database.

As shown in FIG. 1, Internet 18 is coupled to server 12 and customer computers 22 and 24. Customer computer 22 may include an Internet phone for establishing verbal communications between the customer and an agent across Internet 18. The customer using computer 24 has a telephone 28 and a fax machine 26 coupled to PSTN 14 and located near computer 24. Thus, the user of computer 24 may communicate with an agent of the transaction processing system using Internet 18 (e.g., using an Internet phone or e-mail application), fax machine 26, telephone 28, or any combination thereof. For example, customer 24 may generate and transmit an e-mail message across Internet 18 to server 12. Server 12 then communicates the e-mail to transaction processing system 10, which provides the e-mail to a particular agent or group of agents for response. Agents may be grouped together based on area of expertise, company department, or type of support provided (e.g., sales or technical support). The agent responding to the e-mail can respond with another e-mail message or may respond by telephone, facsimile, or any other type of transaction supported by the transaction processing system and the transaction initiator. In particular embodiments of the invention, the transaction initiator may specify the type of transaction used by the responding agent. For example, a transaction initiator may generate an e-mail transaction, but request that an agent respond with a telephone call. Although customer computers 22 and 24 are shown coupled directly to Internet 18, it will be appreciated that any communication mechanism can be used to couple computers 22 and 24 to Internet 18, such as PSTN 14 and an internet Service Provider (ISP). In alternate embodiments, Internet 18 may be replaced with any communication network using any communication protocol.

The environment illustrated in FIG. 1 includes a separate LAN 16 and Internet 18. In alternate environments, LAN 16 and Internet 18 are merged into a single communication network capable of communicating information between any two or more devices coupled to the communication network.

Figure 2:
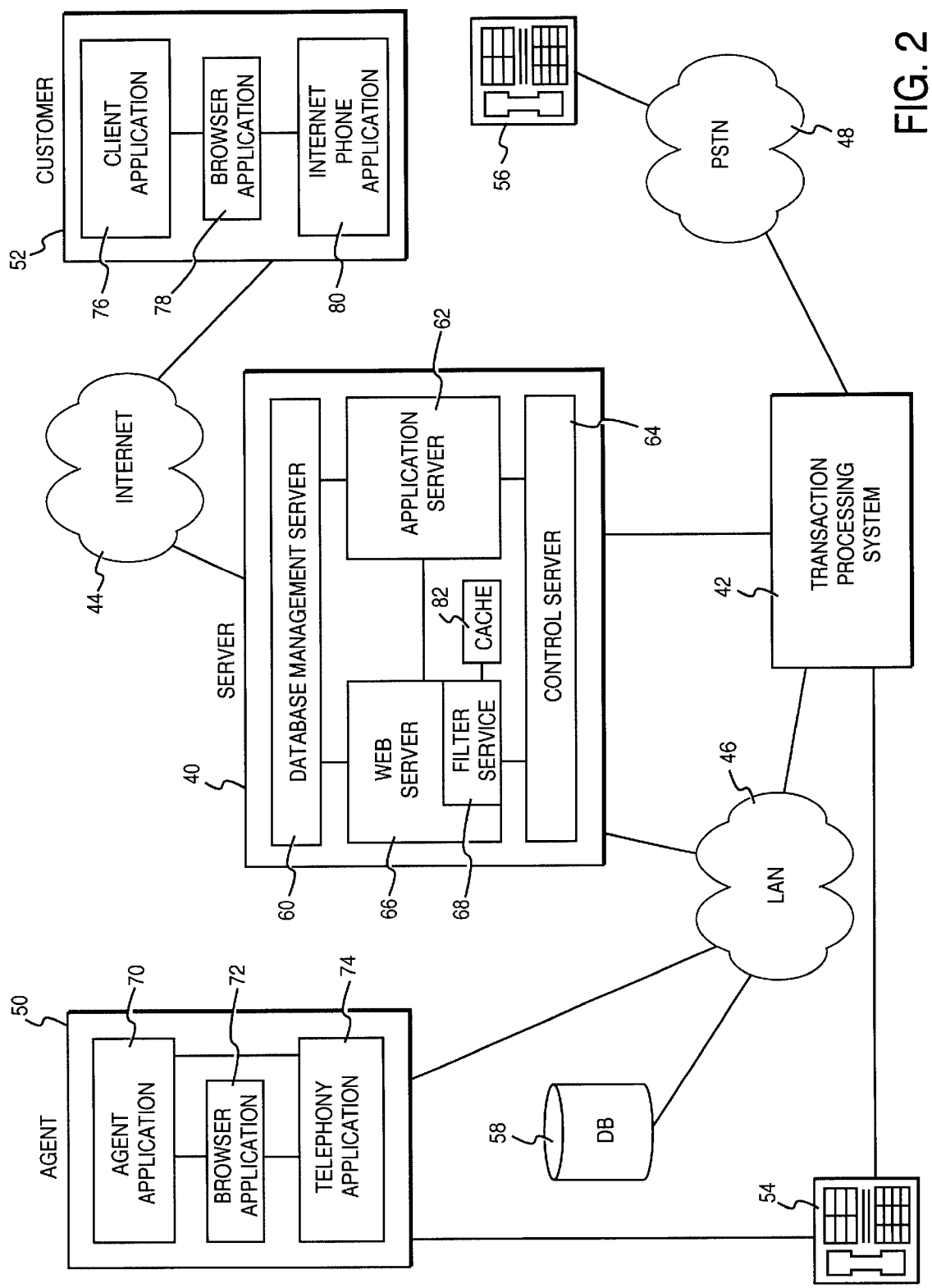
FIG. 2 illustrates an embodiment of a transaction processing environment including a server, an agent computer system, a customer computer system, and a transaction processing system coupled together using various networks.

FIG. 2 illustrates an embodiment of a transaction processing environment including a server 40, an agent computer system 50, a customer computer system 52, and a transaction processing system 42 coupled together using various networks. FIG. 2 illustrates a single agent computer system 50 and a single customer computer system 52. However, a typical transaction processing environment includes multiple agent computer systems and multiple customer computer systems. Server 40 is coupled to Internet 44, a LAN 46, and transaction processing system 42. Server 40 includes a database management server 60, an application server 62, a control server 64, and a web server 66. Additional details regarding server 40 are discussed below. In alternate embodiments, server 40, computer systems 50 and 52, and transaction processing system 42 are coupled together using different network configurations and network connections. Transaction processing system 42 is capable of processing various types of transactions, such as telephone calls, e-mail, voice mail, and facsimiles. In a particular embodiment of the invention, transaction processing system 42 is an automatic call distributor (ACD).

Agent computer system 50 includes an agent application 70, a browser application 72, and a telephony application 74. Agent application 70 interacts with other devices shown in FIG. 2 (e.g., server 40 and transaction processing system 42). For example, agent application 70 may retrieve information about a transaction initiator (such as account information and the types of products or services purchased) and display that information to the agent. In this example, agent application 70 is a client of database management server 60, which retrieves the appropriate information about the transaction initiator from a database 58. If the agent is a technical support agent, the information about the transaction initiator may include the types of products owned by the transaction initiator, previous problems encountered by the transaction initiator, and known problems with the products. Additionally, agent application 70 can display information regarding agent performance, the overall performance of the transaction processing system, and the current status of the agent (e.g., active or inactive).

Browser application 72 is any browser capable of communicating information across a communication link and displaying received information to the agent. In a particular embodiment, browser application 72 is capable of retrieving information from Internet 44 (e.g., in the form of Hypertext Markup Language (HTML) pages). Exemplary browser applications include Netscape Communicator™ sold by Netscape Communications Corporation of Mountain View, Calif., and Internet Explorer™ sold by Microsoft Corporation of Redmond, Wash. Embodiments of the invention exchange information between agent application 70 and browser application 72. In other embodiments of the invention, agent application 70 and browser application 72 are integrated into a single application.

Telephony application 74 controls a telephone 54 coupled to agent computer system 50 and transaction processing system 42. In other embodiments of the invention, a telephone adapter replaces telephone 54 and permits agent computer system 50 to perform the functions of a conventional telephone. For example, a WinSet™ adapter sold by Aspect Telecommunications of San Jose, Calif., may be used instead of telephone 54. Another embodiment of the invention uses a software-based telephone in place of telephone 54. In this embodiment, the software-based telephone is integrated into telephony application 74 and communicates with transaction processing system 42 through server 40 or LAN 46.

Customer computer system 52 includes a client application 76, a browser application 78, and an Internet phone application 80. Client application 76 may be any type of application capable of being executed by customer computer system 52. For example, client application 76 can be a word processor from which text is copied to browser application 78. Although FIG. 2 illustrates client application 76 and browser application 78 coupled to one another, in alternate embodiments of the invention there is no direct coupling of client application 76 and browser application 78.

Browser application 78 is any browser capable of communicating information across a communication link and displaying received information to the customer. Browser application 78 is not necessarily the same type of browser application used in agent computer system 50. In a particular embodiment, browser application 72 is capable of retrieving information from Internet 44 (e.g., in the form of Hypertext Markup Language (HTML) pages). Exemplary browser applications include Netscape Communicator™ and Internet Explorer™, identified above. Embodiments of the present invention can be implemented without any interaction between browser application 78 and other applications executed by customer computer system 52.

Internet phone application 80 allows the user of computer system 52 to establish a voice communication link across Internet 44 instead of using a telephone 56 and a PSTN 48. In particular embodiments of the invention, customer computer system 52 does not contain an Internet phone application. In these embodiments, the user of computer system 52 uses telephone 56 and PSTN 48 to establish a voice communication link with another individual or system. Alternatively, the user of computer system 52 may use a text chat window, discussed below with respect to FIG. 6, to communicate with another individual or system.

Database management server 60 (contained in server 40) manages information contained in database 58. The information stored in database 58 includes customer information, product or service information, transaction tracking information, and other data that may be used by transaction processing system 42, agents, customers, or server 40. Application server 62 communicates with database management server 60 and provides information to agent application 70. For example, application server 62 can retrieve information about a customer from database 58 using database management server 60. The retrieved information is then provided to agent application 70 across LAN 46 for display on agent computer system 50.

Control server 64 performs multiple control and management functions, as discussed in greater detail below with respect to FIG. 3. Control server 64 establishes and maintains communication links between multiple pairs of agents and customers. Control server 64 communicates with transaction processing system 42 to locate one or more available agents, establishes data and/or voice connections between agents and customers, and controls the flow of data between agents and customers.

Web server 66 communicates data, in the form of web pages, to browser applications 72 and 78. Additionally, web server 66 stores web pages and other web-based information used by the devices in the transaction processing environment. In alternative embodiments, the functionality of the control server 64 may be incorporated into web server 66. When the web server 66 is a portion of a host system providing content and other requested resources, the host system may be referred to as a resource host. When the web server 66 is used primarily for maintaining the collaboration session between agents and customers, the host system may be referred to as a session host.

Web server 66 includes a filter service 68 that filters and modifies various web pages. Filter service 68 changes the web page content (e.g., by adding JavaScript methods) to allow the coordination and exchange of information between browser applications 72 and 78.

For example, if a customer using browser application 78 changes information on a web page by entering information on a form, the information entered by the customer may be communicated to the agent's browser application 72. Similarly, if an agent selects a different web page using browser application 72, the selected web page may be delivered to browser application 78 for viewing by the customer. Thus, the changes made to the web page by filter service 68 allow other services, discussed below, to coordinate web pages and web page information between browser applications 72 and 78 such that the agent and the customer view the same web page with the same information. Additional details regarding the various services that coordinate and exchange information between the browser applications are provided below with respect to FIGS. 3 and 4.

Figure 3:
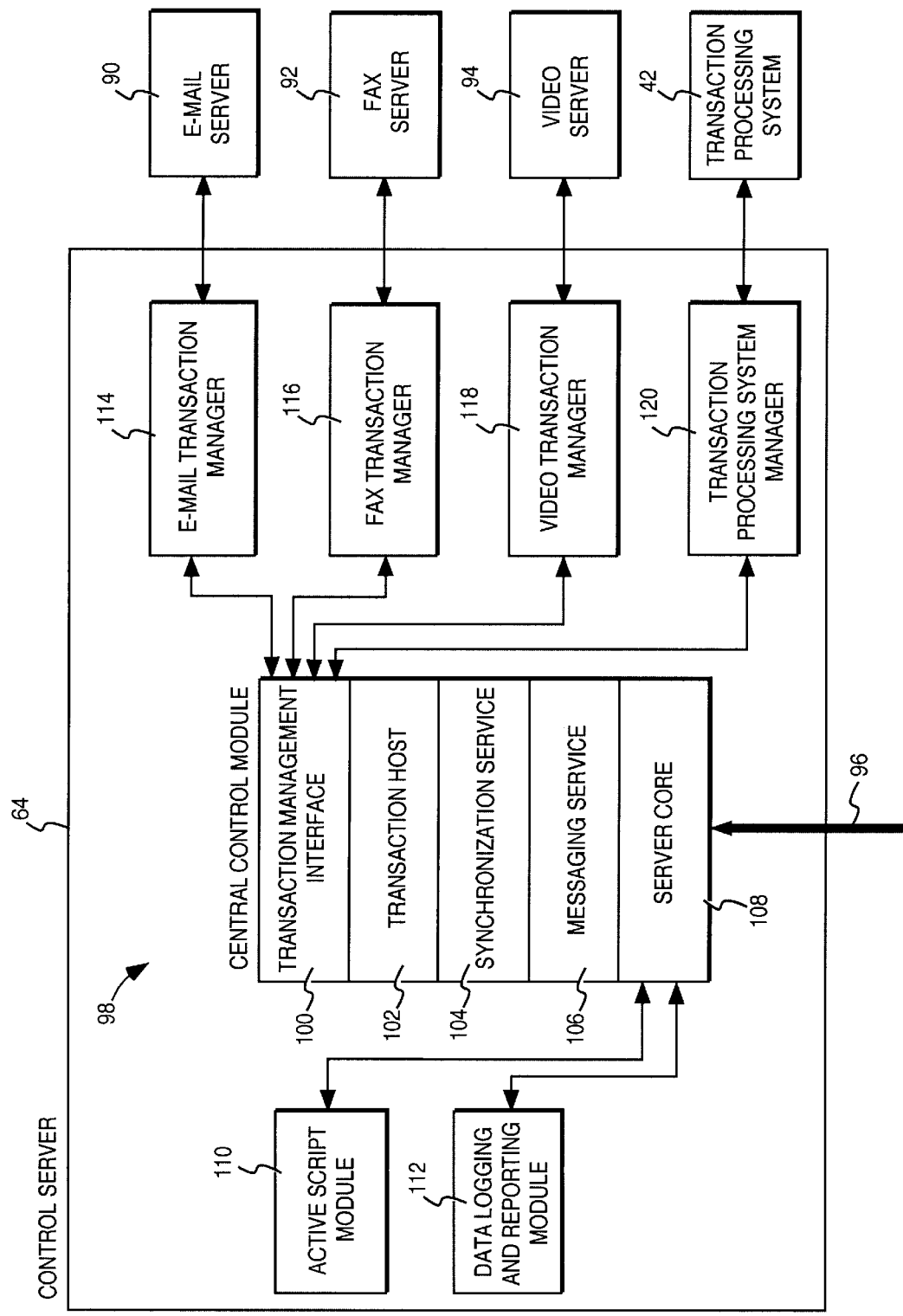
FIG. 3 illustrates an embodiment of a control server.

FIG. 3 illustrates an embodiment of control server 64, shown as part of server 40 in FIG. 2. Control server 64 is shown coupled to an e-mail server 90, a fax server 92, a video server 94, and transaction processing system 42. E-mail server 90 handles both incoming e-mail (e.g., from a customer) and outgoing e-mail (e.g., from an agent). Fax server 92 handles both incoming and outgoing facsimiles. Video server 94 handles video information and video sessions, for use by an agent, customer, or other device or user in the transaction processing environment. Additionally, video server 94 handles other multimedia information and multimedia sessions (e.g., sessions that exchange both audio and video data). Transaction processing system 42 handles various transactions, as discussed above. E-mail server 90, fax server 92, and video server 94 may be coupled directly to control server 64 (and server 40 shown in FIG. 2) or coupled to control server 64 through a network (e.g., LAN 46) or other communication medium. In alternate embodiments of the invention, any one or more of servers 90–94 can be contained within server 40 (FIG. 2) and coupled directly to control server 64.

Control server 64 communicates with e-mail server 90, fax server 92, and video server 94 using any type of communication medium, such as LAN 46. In this embodiment of the invention, control server 64 communicates with transaction processing system 42 using a dedicated communication line, as shown in FIG. 2. In alternate embodiments of the invention, control server 64 communicates with transaction processing system 42 across a network, such as LAN 46 (FIG. 2). Control server 64 also communicates with other systems, such as browser applications and web servers, using a communication link 96. In an embodiment of the invention, communication link 96 is a network communication link (e.g., a communication link in LAN 46). Alternatively, communication link 96 may be a dedicated communication link to one or more devices in the transaction processing environment. Communication link 96 is used to communicate various commands and other information between control server 64 and other devices.

As shown in FIG. 3, control server 64 includes an active script module 110 that handles the display of scripts and other information to an agent using the agent's browser application 72. An embodiment of active script module 110 generates scripts in the form of web pages that can be displayed on the agent's browser application. Additional details regarding agent scripts and other information displayed using an agent's browser application are provided below with respect to FIG. 6.

A data logging and reporting module 112 controls the storage (or logging) of transaction information in database 58 using database management server 60. Additionally, module 112 is capable of generating various types of reports summarizing or identifying performance characteristics and other information related to the transaction processing environment. For example, module 112 may generate reports detailing the overall transaction handling performance, such as the number of transactions handled per hour, the average response time for each type of transaction, and the number of transaction responses that exceeded a quality of service limit for the transaction.

A central control module 98 includes a transaction management interface 100, a transaction host 102, a synchronization service 104, a messaging service 106, and a server core 108. Server core 108 receives new requests (e.g., on communication link 96) from other devices in the transaction processing environment and provides the request to one or more other modules for processing. For example, server core 108 may continuously monitor communication link 96 for request signals that can be handled by server core 108. If the request signal is a request to generate a performance report, server core 108 forwards the request to data logging and reporting module 112 for processing. Module 112 then generates the requested report and provides the report to server core 108, which communicates the report to the appropriate device via communication link 96. Similarly, if the request signal is a request for an agent script, server core 108 forwards the request to active script module 110, which selects or generates an appropriate agent script. Module 110 provides the agent script to server core 108, which then communicates the agent script to the appropriate device (e.g., the requesting device).

Requests that cannot be handled by active script module 110 or data logging and reporting module 112 are communicated to another portion of central control module 98 for processing. Messaging service 106 establishes and manages message types used to communicate information between two or more individuals or devices in a transaction processing environment (e.g., message types used to communicate information between an agent and a customer). After a communication link has been established between, for example, an agent and a customer, messaging service 106 maintains the network or communication addresses for both the agent and customer. Typically, messaging service 106 establishes and manages multiple communication links for multiple customer-agent communications.

Synchronization service 104 synchronizes changes between all participants in a particular communication. For example, in an agent-customer communication, any changes entered to a web page by the customer are identified by synchronization service 104, and provided to the agent's browser application. Thus, synchronization service 104 ensures that all participants in a communication are provided with the same information.

Transaction host 102 manages various portions of the interaction between, for example, an agent and a customer. Transaction host 102 maintains the status of multiple interactions and maintains the identity (such as the network or communication address) of each participant involved in each interaction. If a request is received to provide information to a participant, then transaction host 102 determines the address associated with the participant and provides the address to the appropriate module responsible for providing the requested information.

Transaction management interface 100 is coupled to an e-mail transaction manager 114, a fax transaction manager 116, a video transaction manager 118, and a transaction processing system manager 120. Transaction management interface 100 manages the interaction and exchange of information between central control module 98 and the various transaction managers 114–120. Each transaction manager 114–120 handles a particular type of transaction, and communicates with the server responsible for that transaction type. In alternate embodiments of the invention, two or more of transaction managers 114–120 are combined into a single transaction manager. When server core 108 receives a request that requires interaction with a server or device external to control server 64, then transaction management interface 100 contacts the appropriate transaction manager for processing the request. For example, if server core 108 receives a request to select an agent to handle a transaction, then transaction management interface 100 contacts transaction processing system manager 120 to request an agent from transaction processing system 42.

Transaction management interface 100 may receive requests (or calls for service) from server core 108 or transaction host 102. Additionally, transaction management interface 100 may receive requests from any transaction manager 114–120. For example, e-mail transaction manager 114 may notify transaction management interface 100 that e-mail server 90 has received an e-mail that requires processing. Transaction management interface 100 then communicates the information regarding the received e-mail to other services or managers to determine how the e-mail should be handled. For example, transaction processing system manager 120 may be contacted to identify an agent to handle the e-mail. The manner in which the e-mail is to be handled is then communicated to e-mail transaction manager 114, which then instructs e-mail server 90 regarding the processing of the e-mail.

Figure 4:
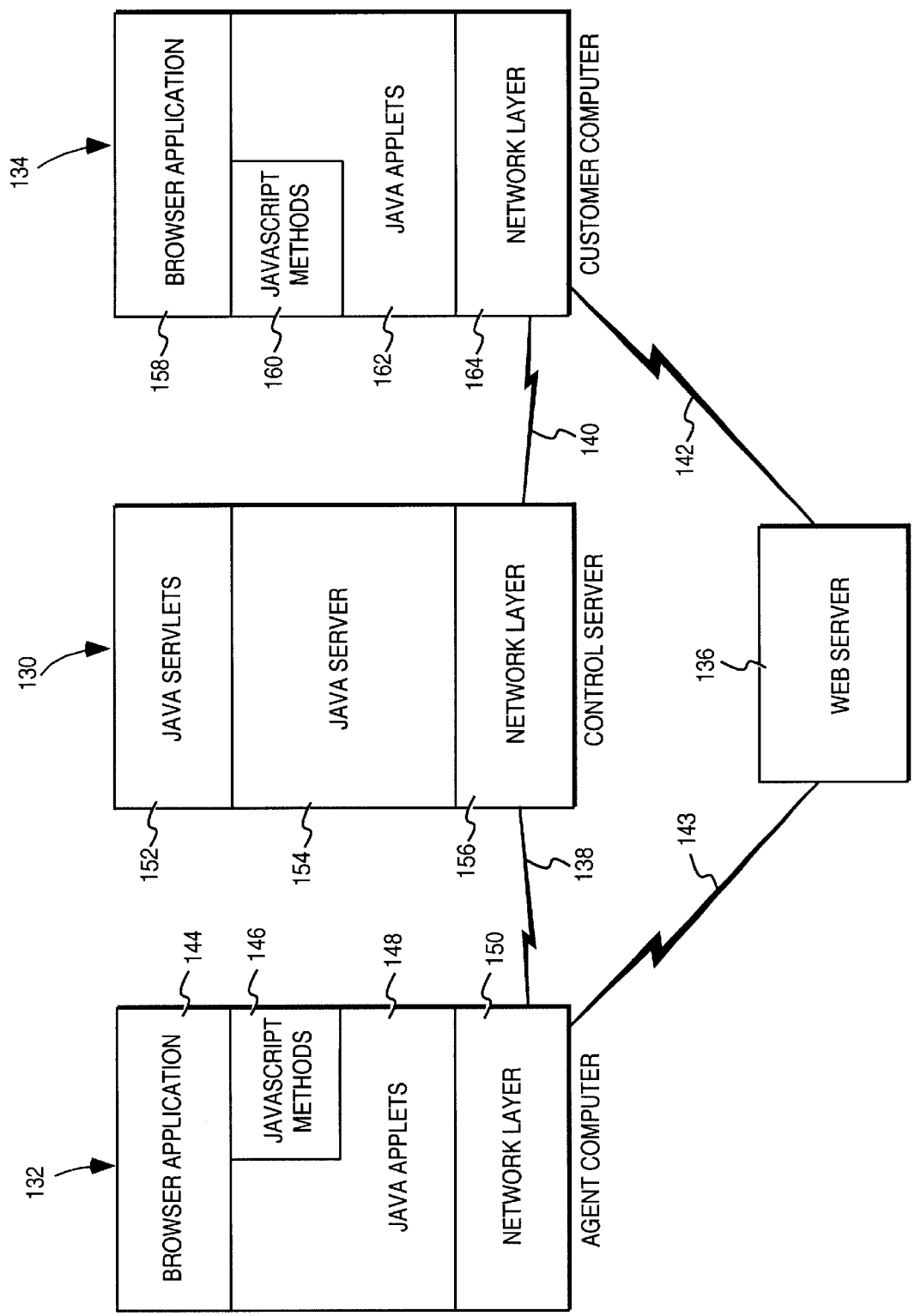
FIG. 4 illustrates an embodiment of a system architecture for communicating information between various devices in a transaction processing environment.

FIG. 4 illustrates an embodiment of a system architecture for communicating information between various devices in a transaction processing environment. The system architecture of FIG. 4 includes a control server 130, an agent computer 132, and a customer computer 134. Agent computer 132 is coupled to control server 130 via communication link 138 (e.g., LAN 46 in FIG. 2) and coupled to a web server 136 via communication link 143 (e.g., Internet 44). Customer computer 134 is coupled to control server 130 using communication link 140 (e.g., Internet 44 in FIG. 2). Customer computer 134 is also coupled to web server 136 via communication link 142 (e.g., Internet 44). Web server 136 stores and distributes various web pages requested by a browser application. Although web server 136 and control server 130 are shown as two separate servers in FIG. 4, they may be hosted by the same hardware or the same server system.

Agent computer 132 contains a browser application 144 of the type discussed above with respect to FIG. 2. The embodiment of the system architecture shown in FIG. 4 is implemented using the Java T™ programming language (Java is a trademark of Sun Microsystems Inc. of Mountain View, Calif.). Alternate embodiments of the invention may be implemented using other programming languages, including object-oriented programming languages. Agent computer 132 contains one or more JavaScript methods 146 and one or more Java applets 148. A JavaScript method is a sequence of instructions that perform various operations and have the ability to invoke Java methods. A Java applet is a program, written in Java, that may be stored within a web page. When the web page is retrieved by a browser application, the Java applet is executed by the browser and performs the programmed operations. The activity or operation performed by the agent (or the agent's browser application 144) determines whether a JavaScript method or a Java applet is activated. For example, if the agent clicks an icon associated with a Java applet, then the Java applet is activated. However, if the agent performs an operation that is associated with a JavaScript method, then the JavaScript method is performed in response to the operation.

Agent computer 132 includes a network layer 150, which is a logical layer at which agent computer 132 communicates with other devices via communication link 138. Control server 130 has a network layer 156, which communicates with control layer 150 to exchange information between control server 130 and agent computer 132. A Java server 154 communicates with network layer 156 to exchange information with other devices (e.g., agent computer 132 and customer computer 134). Java server 154 corresponds to server core 108 (FIG. 3) and controls the overall operation of control server 130. Java server 154 is implemented using the Java programming language. Java server 154 communicates with one or more Java servlets 152, which perform various operations necessary to process transactions and communicate information between devices. In a particular embodiment, Java servlets 152 may correspond to various modules shown in FIG. 3, such as transaction management interface 100, transaction host 102, synchronization service 104, messaging service 106, active script module 110, and data logging and reporting module 112.

A network layer 164 in customer computer 134 communicates with network layer 156 and with web server 136. Although not shown in FIG. 4, web server 136 may also include a network layer for communicating data across communication link 142. Customer computer 134 contains one or more Java applets 162 and one or more JavaScript methods 160. Additional details regarding the operation of Java applets 162 and JavaScript methods 160 are provided below. Customer computer 134 also includes a browser application 158 of the type discussed above with respect to FIG. 2.

In a particular embodiment of the invention, an agent is able to "push" a web page or other information to a customer using the system shown in FIG. 4. For example, the agent may identify a particular web page and communicate the uniform resource locator (URL) associated with the web page to customer computer 134 via control server 130. The customer's browser application 158 receives the URL and retrieves the associated web page from web server 136. Thus, the agent "pushes" the web page to the customer by providing the URL associated with the web page to the customer's browser application.

Figure 5:
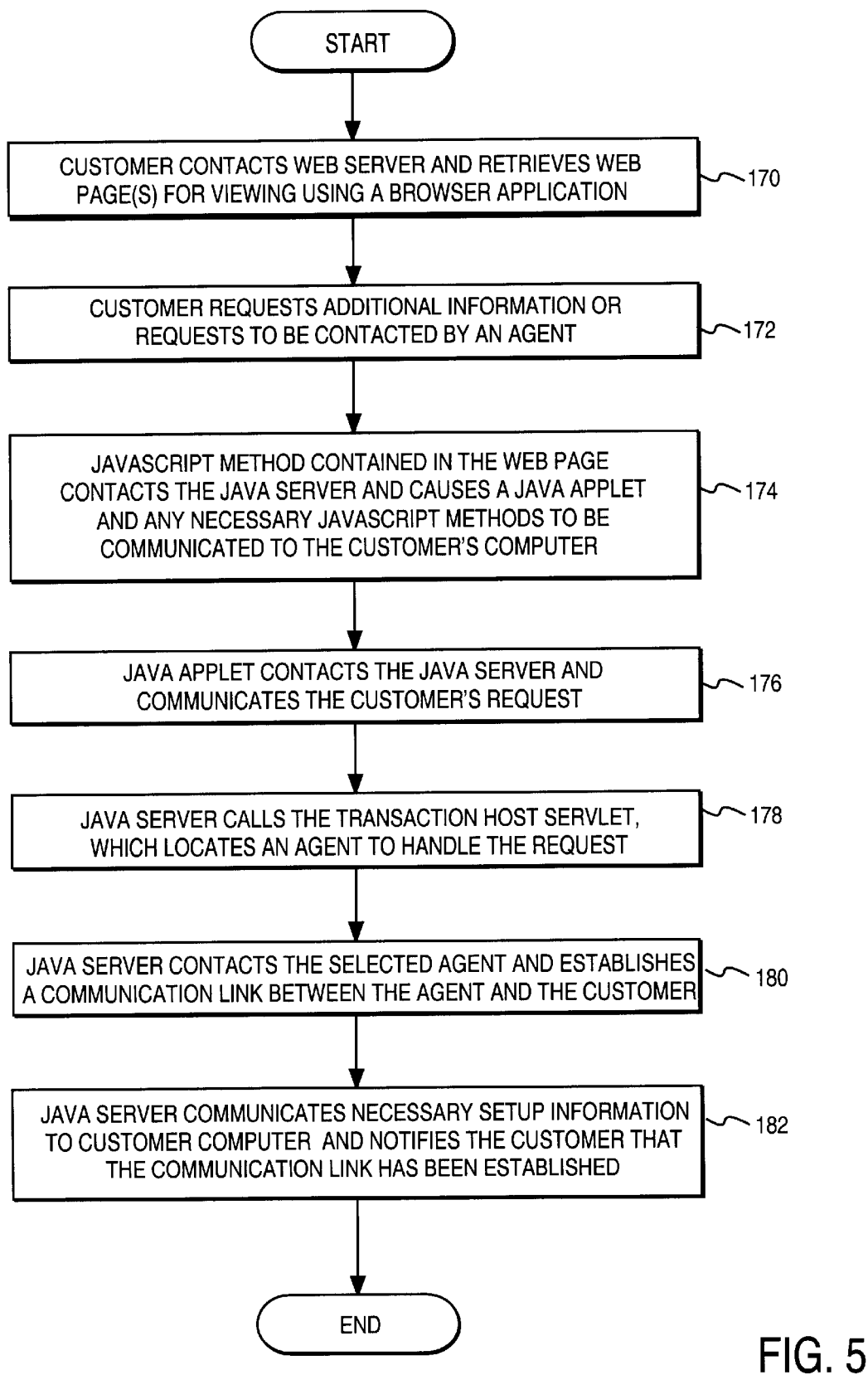
FIG. 5 is a flow diagram illustrating an embodiment of a procedure for communicating information between various devices using the architecture of FIG. 4.

FIG. 5 is a flow diagram illustrating an embodiment of a procedure for communicating information between various devices using the architecture of FIG. 4. At step 170, a customer contacts a web server (e.g., web server 136) and retrieves one or more web pages for viewing using a browser application (e.g., browser application 158). At step 172, the customer requests additional information about a product or service, or requests to be contacted by an agent. The customer may specify the manner in which the information or agent contact is handled (e.g., by return telephone call, by e-mail, or by facsimile). If the customer requests to be contacted using a conventional telephone or by facsimile, then the customer is asked to provide a telephone number for initiating the telephone call or facsimile. At step 174, a JavaScript method, contained in the web page accessed by the customer, is executed by the customer's browser application. When executed, the JavaScript method causes the customer's computer to contact the Java server (e.g., Java server 154) and requests a Java applet and any necessary JavaScript methods. The requested Java applet and JavaScript methods are then communicated from the Java server to the customer's computer. The particular Java applet and JavaScript methods communicated to the customer's computer may vary depending on the web page that was being viewed by the customer when the request for additional information or agent contact was entered. The particular web page being viewed may contain JavaScript methods that identify the necessary Java applet and JavaScript methods to be communicated to the customer's computer.

At step 176, the Java applet (running on the customer's computer) contacts the Java server and communicates the customer's request to the Java server. In this example, the customer has requested that an agent contact the customer by return telephone call. Step 178 calls the transaction host servlet (e.g., the servlet that performs the functions of transaction host 102 in FIG. 3), which locates an agent to handle the customer's request. An agent may be located by communicating with transaction processing system manager 120 to select an agent and to initiate a telephone call across the PSTN.

After an agent has been selected to handle the customer's request, step 180 contacts the selected agent and informs the agent regarding the customer's request. At this time, information about the customer may be displayed to the selected agent (e.g., account information, or past purchases). Step 180 also establishes a communication link (in this example, a telephone link) between the selected agent and the customer. A transaction processing system may be used to automatically establish the telephone link across a PSTN or a web server may be used to establish an Internet telephone call across the Internet. In particular embodiments of the invention, both a voice communication link and a data communication link are established between the agent and the customer. The data communication link can be established and maintained by the control server. Both the agent computer and the customer computer may communicate with the control server, which coordinates the flow of messages and other information between the agent and the customer. For example, the control server forwards messages received from the agent computer system to the customer computer system, and vice versa.

At step 182, the Java server communicates any necessary setup information to the customer's computer and notifies the customer that the communication link has been established. This notification can be performed, for example, by communicating through the network layers to the customer's browser application. In this example, the customer requested a return telephone call. Although a return telephone call has been initiated, the customer and the agent may continue to communicate using their browser applications. For example, the agent may "push" web pages or other information to the customer for viewing using the customer's browser application.

Figure 6:
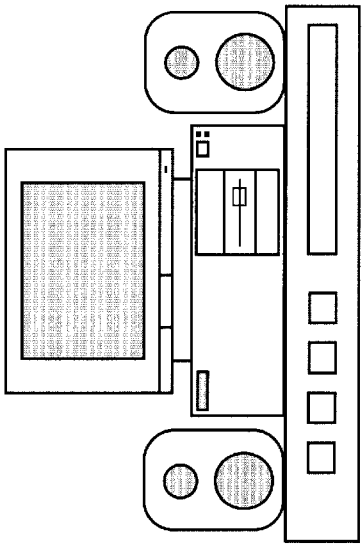
FIG. 6 illustrates an embodiment of various windows displayed to an agent using the agent's computer.

FIG. 6 illustrates an embodiment of various windows (also referred to as frames) displayed to an agent using the agent's computer. An agent's computer includes a display device that provides visual information to the agent. In FIG. 6, an agent's browser application generates a display 190 containing multiple frames 192, 194, 196, 198, and 200. Frame 192 represents the web page or other information currently being displayed to the customer. Thus, the agent is able to easily determine what information is available to the customer based on frame 192. Additionally, the agent can provide additional information about a product or service while referring to the information already displayed to the customer. Frame 194 is a text chat window that allows the agent and the customer to communicate using typed information. The text chat window can be used at any time, and is particularly useful when a voice connection cannot be established between the agent and the customer (e.g., the customer does not have an Internet phone and has only one telephone line, which is used to access the Internet).

Frame 196 of display 190 contains various system information such as information about the agent and information relating to the overall system performance. Frame 196 may also be used to display messages to an agent from a supervisor or system administrator (e.g., asking the agent if they are available to work overtime, or notifying the agent of their next scheduled break). Frame 198 displays agent script information, such as a prepared script to be read to a customer. The script displayed in frame 198 may be modified to correspond to the product or service being discussed, or the script may be modified to include information about the customer (e.g., the customer's name). Frame 200 provides various links to information that may be provided by the agent to the customer. In a particular embodiment of the invention, the links shown in frame 200 are associated with web pages that contain information of interest to particular customers. For example, the link "FAQ—Acme XL-3000" may identify a web page that contains answers to frequently asked questions about the Acme XL-3000 computer system. If the agent wants to display these answers to the customer, the agent can select the link, which causes the web page to be transmitted to the customer's browser application. The same web page is then displayed in frame 192, to maintain correspondence between frame 192 and the web page displayed to the customer.

Particular embodiments of the systems described above are capable of monitoring information access (e.g., monitoring the web pages viewed by a customer or other individual). Exemplary procedures for monitoring information access are provided below with reference to the accessing of information from web pages using, for example, a web browser application. However, the present invention is not limited to the monitoring of web page access by a web browser. The teachings of the present invention can be applied to any type of system capable of accessing information from one or more information storage mechanisms.

Figure 7A:
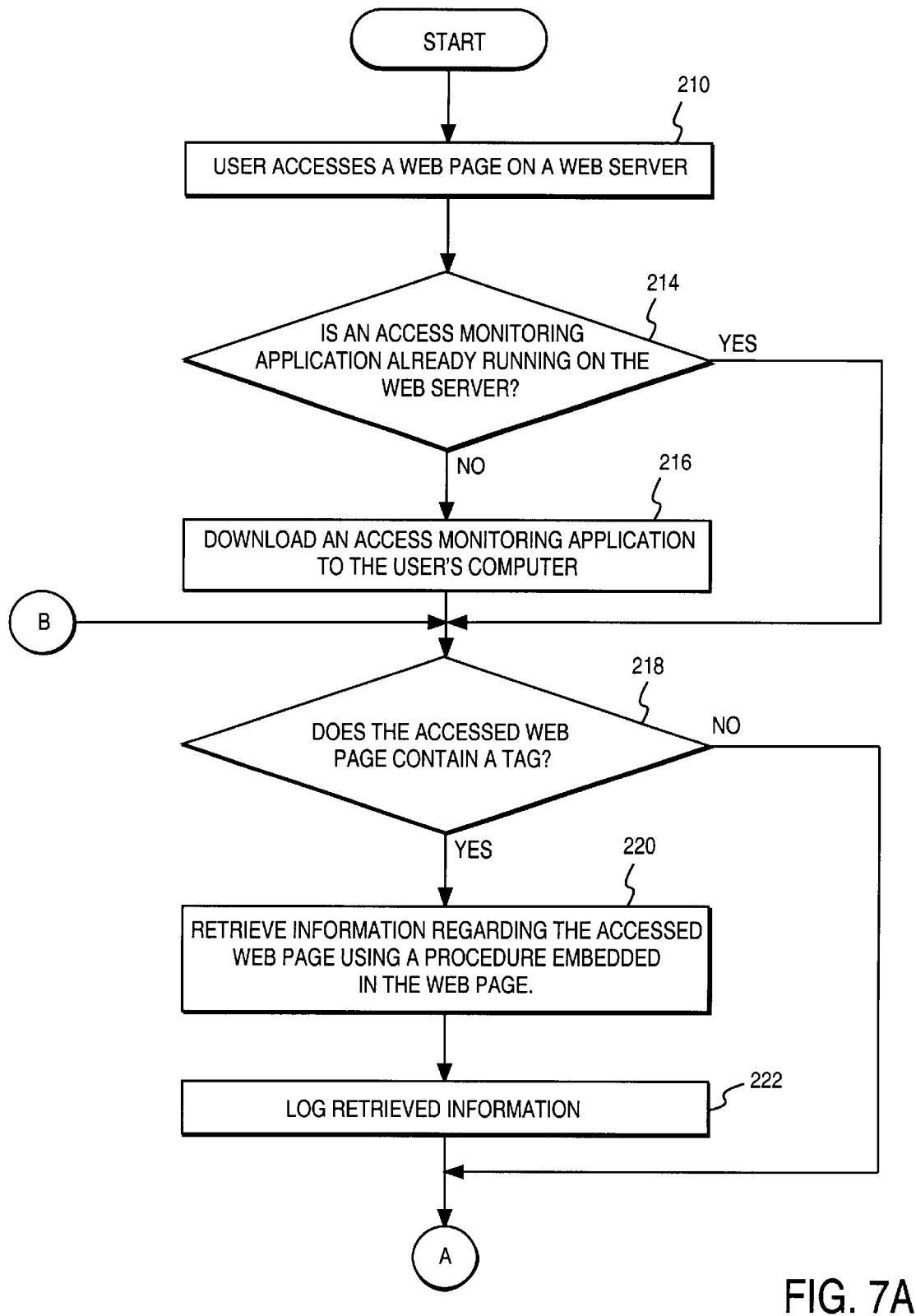
FIGS. 7A and 7B illustrate an embodiment of a procedure for monitoring web page access.
Figure 7B:
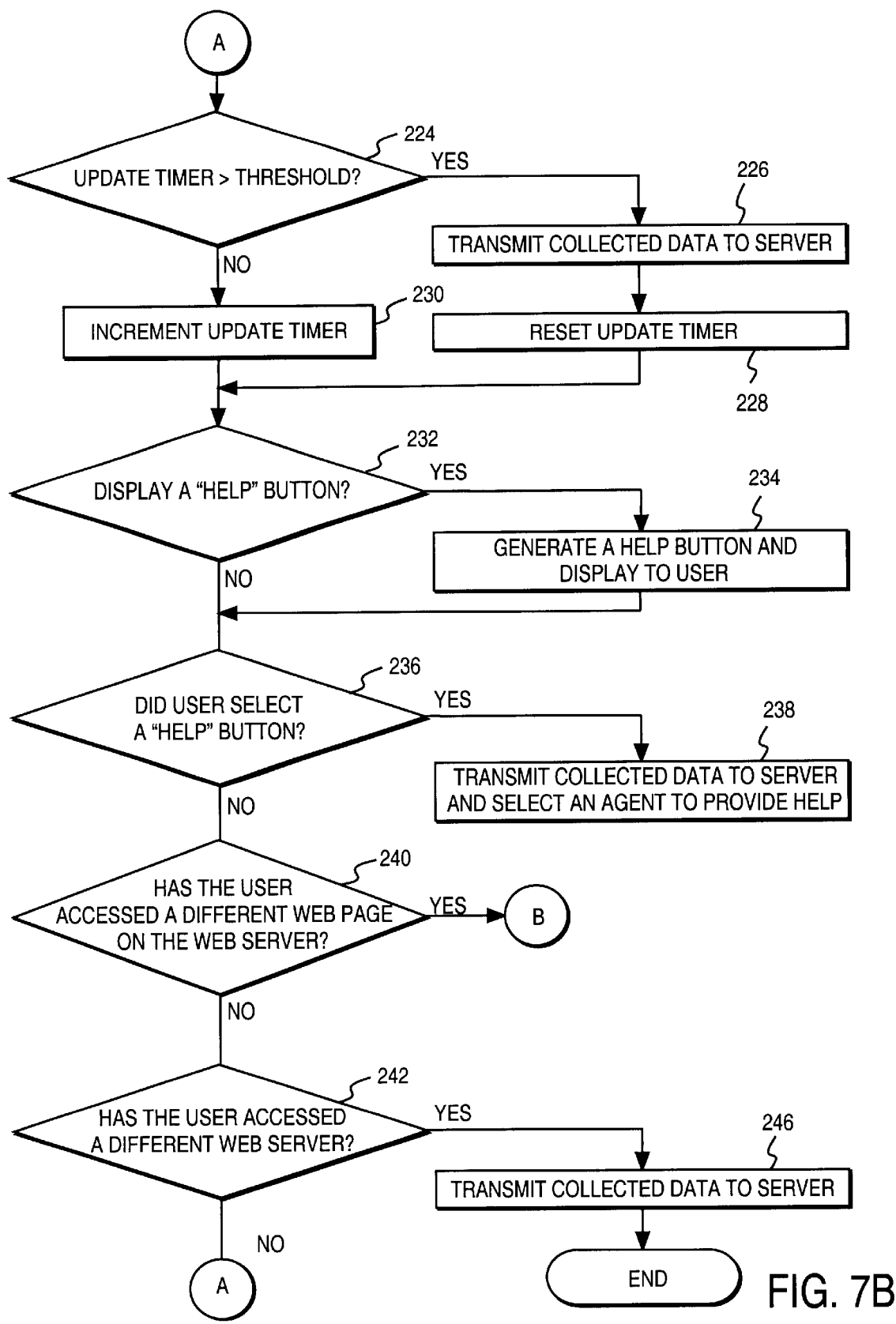

FIGS. 7A and 7B illustrate an embodiment of a procedure for monitoring web page access. The procedure illustrated in FIGS. 7A and 7B monitors web page access for a particular individual or a particular system. Similar procedures may be executed simultaneously to monitor web page access by other users or other systems. At step 210 a user accesses a web page (e.g., with reference to FIG. 2, a customer 52 accesses web server 66, which contains one or more web pages). At step 214, the procedure determines whether an access monitoring application is already running on the web server. An access monitoring application is downloaded to the user's computer the first time a web server is accessed during a current session. A session is a particular web searching or web accessing activity that may last for several minutes or several hours.

If step 214 determines that an access monitoring application is already running on the web server, then the procedure branches to step 218 to avoid unnecessarily downloading the access monitoring application. However, if an access monitoring application is not already running on the web server, then the procedure continues to step 216 to download an access monitoring application to the user's computer (e.g., the user's web browser application). Typically, the access monitoring application is downloaded from the web server to the user's computer. In a particular embodiment of the invention, the access monitoring application is a JavaScript method that can invoke a Java applet. The access monitoring application is executed by the user's computer (e.g., executed by a browser application) and is capable of monitoring web pages or other information accessed by the user. Additionally, the access monitoring application is able to retrieve and store information regarding the information contained in each web page accessed by the user. The data collected by the access monitoring application is provided from the user's computer to a server or other device, as discussed below. The access monitoring application is downloaded to a user once per session; e.g., the first time a web server is accessed by a user. In alternate embodiments of the invention, a particular user's computer may store the access monitoring application after a session has ended. In this embodiment, the access monitoring application is not downloaded to the user's computer.

Since the access monitoring application is executed by the user's computer, the application is able to monitor all web page accesses, including those performed using a web browser's "back" or "forward" functions. Typically, the "back" and "forward" functions retrieve the appropriate web page from a cache or other storage device in the user's computer. In this situation, the web server may not be aware that the user is viewing a different web page, but the access monitoring application is aware of and records the change. When a different web page is displayed, the access monitoring application checks for a tag, and retrieves the information regarding the web page, if the web page is tagged. This tag checking and retrieval of information is performed by the access monitoring application regardless of the manner in which the user selects the web page for display.

Step 218 of FIG. 7A determines whether the accessed web page contains a tag or other identifier. The tag indicates that information regarding the web page is embedded in the web page and can be retrieved by executing a procedure embedded in the web page. Each web page on a particular web server that can be monitored contains a tag or other identifier that indicates that the web page should be monitored. The information embedded in the web page may include the content of the web page (such as a product or service that is displayed or discussed in the web page) and other information used to determine whether or not to display a "Help" button to a user (discussed below). This embedded information is not visible to the user, but can be retrieved using the embedded procedure. In an embodiment of the invention, the embedded procedure is a JavaScript method. Those of ordinary skill in the art will appreciate that various programming languages and programming environments may be used to embed information and procedures within a web page.

If the accessed web page contains a tag, then the procedure continues from step 218 to step 220, where the embedded information regarding the web page is retrieved using a procedure embedded in the web page. At step 222, the information retrieved in step 220 is logged (e.g., stored by the user's computer system). The retrieved information may be stored on a permanent storage device such as a disk drive or stored in a volatile storage device, such as a random access memory (RAM). The logging of retrieved information may also include the amount of time a particular user spends viewing the web page. This time is typically logged when the user accesses a different web page or a different web server.

At step 224 (FIG. 7B), the procedure determines whether an update timer exceeds a threshold. The update timer is maintained by (or contained in) the access monitoring application and is used to periodically transmit data collected regarding the accessed web pages from the user's computer to a server or other device (e.g., server 40 in FIG. 2). The update timer is originally reset when the access monitoring application is downloaded (e.g., step 216 of FIG. 7A). If the threshold has been reached, the procedure branches to step 226, where the collected data is transmitted to the server. Step 228 resets the update timer. If the threshold has not been reached at step 224, then the procedure continues to step 230 where the update timer is incremented. The use of an update timer is not required. Instead, the collected data may be transmitted to the server in response to specific activities, as discussed below.

Step 232 determines whether to display a "Help" button or other assistance icon to the user of the computer system. For example, the "Help" button may be displayed as part of a web page being viewed by the user. If the "Help" button is selected or activated by the user, the system connects an agent with the user (e.g., using an internet phone application or a conventional telephone) to provide assistance to the user. In a particular embodiment of the invention, the information necessary to display the "Help" button (or other assistance icon) is embedded within the web page. When a procedure determines that the "Help" button should be displayed to the user, the procedure activates (e.g., displays) the assistance icon using the embedded information. The determination regarding whether the assistance icon should be displayed may be performed by the server or by the access monitoring application. A system administrator or other individual may set the parameters or rules for determining when to display a "Help" button. Additional details regarding the procedure for determining whether to display a "Help" button are discussed below with respect to FIG. 8. If step 232 determines that a "Help" button should be displayed, then the procedure branches to step 234 to generate a "Help" button and display the button to the user.

At step 236, the procedure determines whether a user selected a "Help" button. A user may select a "Help" button using a pointing device, such as a mouse, to move a cursor over the button and activating a selection mechanism on the pointing device, such as the mouse button. If the user selected a help button, then the procedure branches to step 238, where the data collected regarding web page access is transmitted to a server and an agent is selected to provide help to the user. The user and the agent then communicate to solve the user's problem or answer the user's questions. Although the user and the agent are communicating with one another, the procedure may continue to collect data regarding web pages viewed by the user while communicating with the agent.

At step 240, the procedure determines whether the user has accessed a different web page on the web server. If a different web page has been accessed, the procedure returns to step 218 (FIG. 7A) to determine whether the new web page contains a tag. If the user has not accessed a different web page, then the procedure continues from step 240 to step 242 to determine whether the user has accessed a different web server. If a different web server has been accessed, then the procedure transmits the collected data to a server at step 246. Additionally, the access monitoring application is deleted or otherwise removed from the user's system, and the procedure terminates. Although the procedure terminates, it may be started again (at step 210, FIG. 7A) if the user accesses the web server again at a later time. If the user has not accessed a different web server at step 242, then the procedure returns to step 224.

The procedure described above with reference to FIGS. 7A and 7B may be executed simultaneously on multiple web servers. Thus, although one procedure may be terminated when a user accesses a different web server, a new procedure may be initiated on the new web server.

The data collected regarding web pages accessed by users of a web server can be used to determine the effectiveness of the arrangement of web pages. For example, if a particular web page is viewed by many users for a significant period of time, that web page should be positioned such that it is easy to locate and access by a user. If a popular or useful web page is difficult to locate, the system administrator may rearrange the web page structure for the benefit of the users. The collected data is also useful to determine the popularity or user interest in a particular product or service offered by a company or organization.

Figure 8:
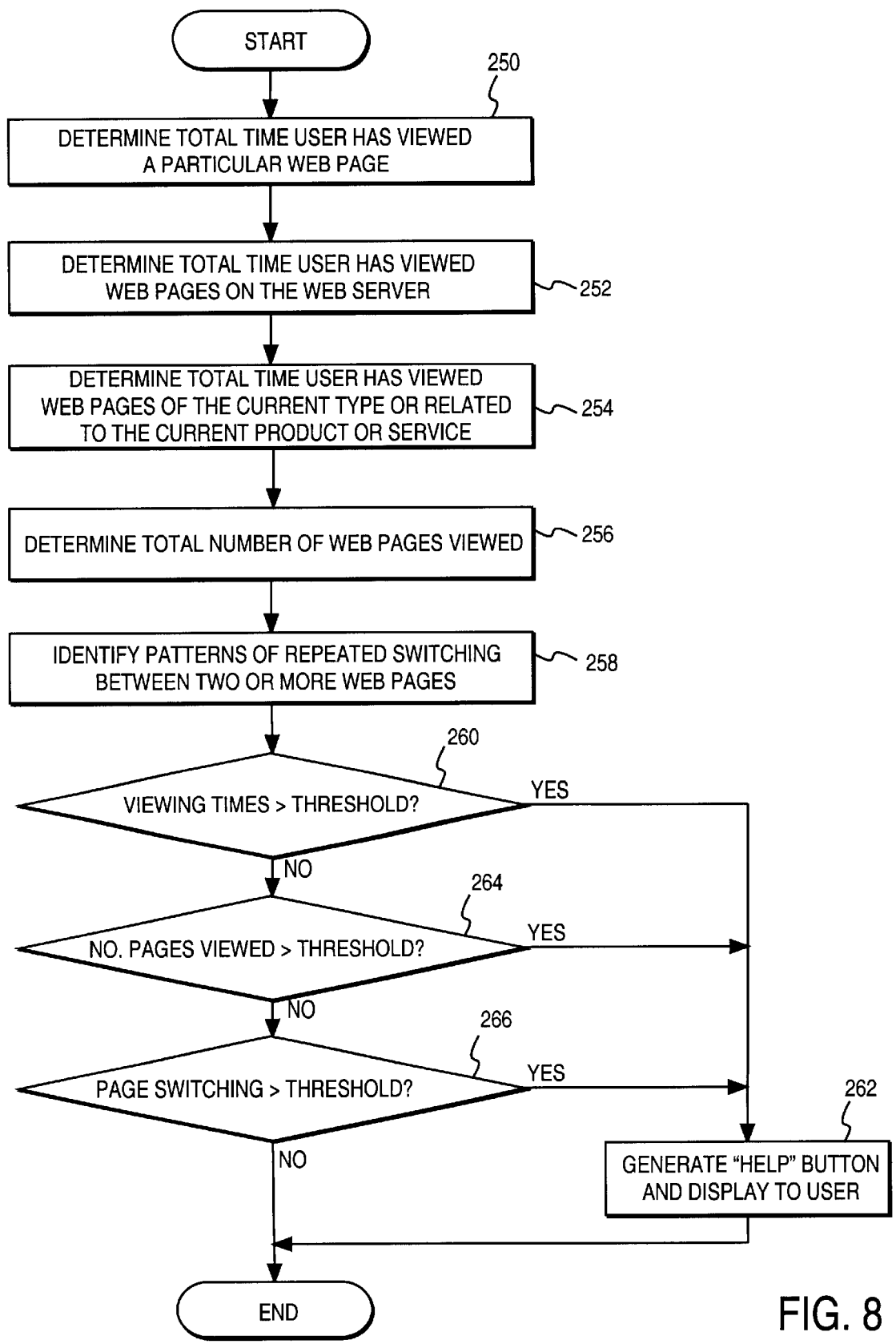
FIG. 8 is a flow diagram illustrating an embodiment of a procedure for determining whether to display a "Help" button (or other assistance icon) to a user.

FIG. 8 is a flow diagram illustrating an embodiment of a procedure for determining whether to display a "Help" button (or other assistance icon) to a user. The procedure illustrated in FIG. 8 can be performed by the user's computer (e.g., the access monitoring application) or performed by a server. At step 250, the procedure determines the total time the user has viewed a particular web page. The amount of time spent viewing a web page may be an indicator of the user's interest in the content of the web page. At step 252, the procedure determines the total time the user has viewed web pages on the web server. The total time spent viewing web pages may indicate a significant interest in the content of the various web pages viewed. A particular system may automatically display a "Help" button to a user after the user has been viewing web pages for a predetermined period of time.

Step 254 determines the total time the user has viewed web pages of the current type being viewed or the time spent viewing web pages related to the currently viewed product or service. If a particular user has been viewing web pages related to a particular product or service for a predetermined period of time, the system may automatically provide a "Help" button that allows the user to request help from an agent regarding the product or service. At step 256, the procedure determines the total number of web pages viewed. If a user views a predetermined number of web pages, then the system may automatically provide a "Help" button to the user.

Step 258 identifies patterns of repeated switching between two or more web pages. For example, if a user is repeatedly switching between web pages associated with two different products, a "Help" button may be provided automatically, thereby allowing the user to request help from an agent. In this example, the agent may provide additional information about the two products being considered by the user. Step 260 determines whether the total viewing time (e.g., the time determined in step 250, 252 or 254) exceeds a threshold. Step 260 may consider any or all of the times determined in steps 250, 252 or 254. The threshold is typically determined by a system administrator or the individual responsible for maintaining the access monitoring application. If the viewing time exceeds the threshold in step 260, then the procedure branches to step 262 to generate a "Help" button and display the button to the user.

Step 264 determines whether the number of pages viewed (e.g., determined by step 256) exceeds a threshold. If the threshold is exceeded, the procedure branches to step 262 to generate and display a "Help" button. Step 266 determines whether any repeated web page switching (e.g., determined by step 258) exceeds a threshold. If the page switching threshold is exceeded, then the procedure branches to step 262 to generate and display a "Help" button to the user.

The procedure illustrated in FIG. 8 represents one possible procedure for determining whether to display a "Help" button to a user. In alternate embodiments of the invention, an algorithm or set of rules may be used to determine when to display a "Help" button to a user. The algorithm or set of rules may consider the identity of the user, the history of the web pages viewed and the time spent viewing each web page, the content of each web page viewed, as well as the other factors discussed above to determine whether to display a "Help" button.

Figure 9:
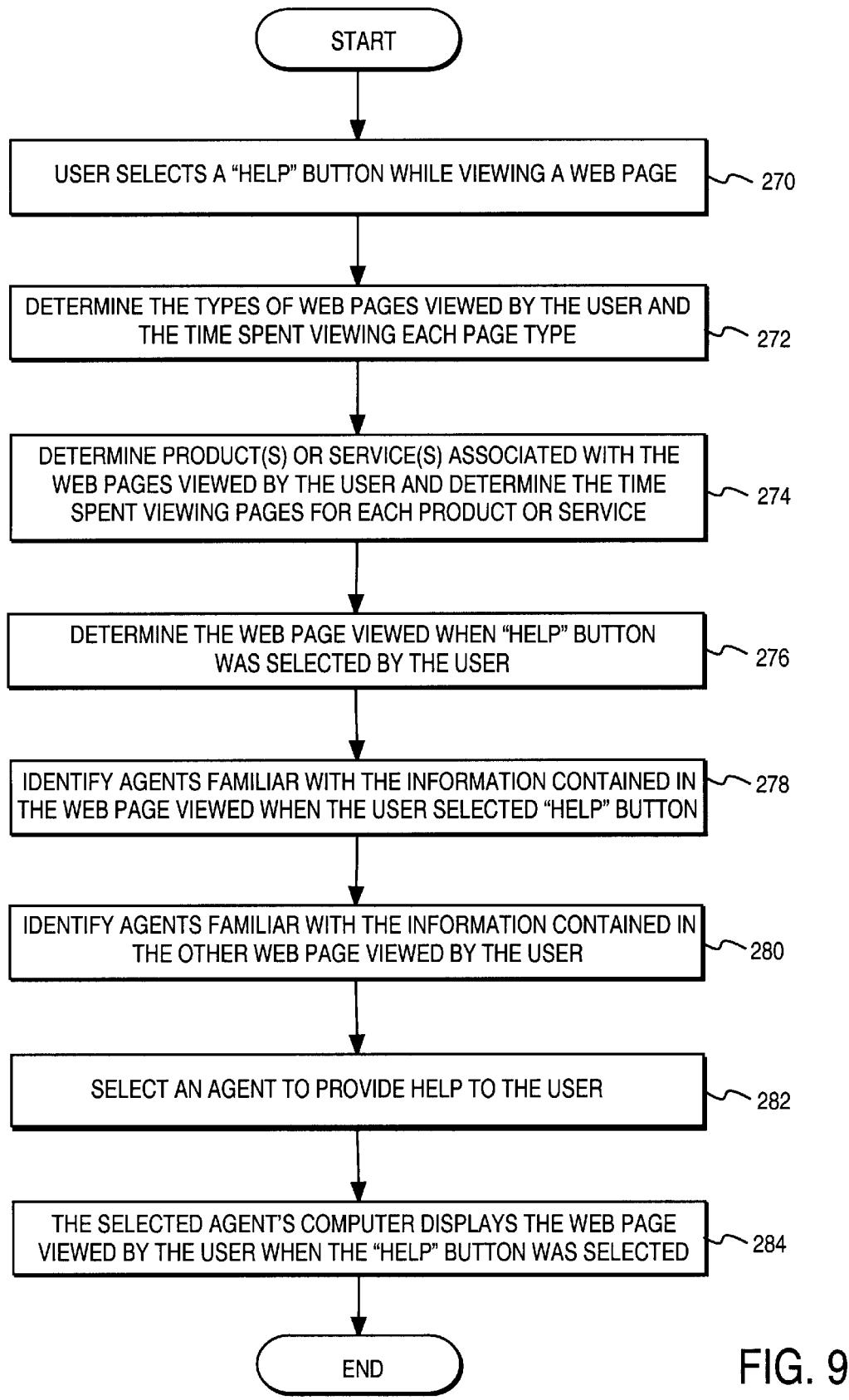
FIG. 9 is a flow diagram illustrating an embodiment of a procedure for selecting an agent to provide help to a user.

FIG. 9 is a flow diagram illustrating an embodiment of a procedure for selecting an agent to provide help to a user. At step 270, a user selects a "Help" button or other assistance icon while viewing a web page. Step 272 determines the types of web pages viewed by the user and the time spent viewing each type of page. A page type may identify a particular product or a type of product, or may identify a particular type of service (e.g., technical support or sales). Step 274 determines the product or service associated with the web pages viewed by the user. Additionally, step 274 determines the time spent viewing web pages for each product or service. An embodiment of the invention combines the determinations performed in step 272 and 274 into a single step.

Step 276 determines the web page being viewed by the user when the user selected the "Help" button. Step 278 identifies agents familiar with the information contained in the web page being viewed by the user when the "Help" button was selected. Step 280 identifies agents familiar with the information contained in the other web pages viewed by the user prior to selecting the "Help" button. Step 282 selects an agent to provide assistance to the user based on the determinations performed in the above steps. Preferably, an agent is selected that is familiar with the information contained in the web page currently viewed by the user and web pages viewed prior to selecting the "Help" button. When an agent has been selected, the web page being viewed by the user when requesting help is displayed on the selected agent's computer display. Thus, when the agent established communication with the user, the agent is viewing the same web page as the user. This provides an indication to the agent of the type of assistance the user may require. The agent may also be provided with information, such as a summary, regarding the content of the web pages previously viewed by the user.

FIG. 10 illustrates an embodiment of a table containing information relating to web pages accessed by a user. The embodiment of FIG. 10 represents one possible arrangement of data. Those of ordinary skill in the art will appreciate that various other data formats and data structures may be used to store information relating to web pages accessed by a user. The first column in the table of FIG. 10 identifies seven different web page identifiers (e.g., URLs) that have been accessed by the user. The second column identifies information contained in each web page. The third column identifies the time spent viewing each page. The third column may be a cumulative time for each page (e.g., if the same page is viewed at two different times, the total viewing time is entered in the third column). The fourth column in the table indicates the type of information contained in the web page. In this example, the type of information relates to the product with which the web page is associated. Although not shown in FIG. 10, alternate embodiments of the invention also record the number of times each web page has been accessed by the user. The information shown in FIG. 10 may be summarized for the benefit of an agent or system administrator. For example, the information in FIG. 10 may be summarized to indicate that 10 minutes have been spent by the user viewing web pages relating to the XL2000 computer system. This may indicate that the user has a significant interest in the XL2000 computer. A separate table is maintained for each user that accesses web pages on the web server.

Web pages can typically be divided into static and dynamic categories. The pertinent content of a static page does not change. Thus the web page content will be substantially the same independent of the identity of the client accessing the page (except for perhaps a counter or other session-specific information). Dynamically generated pages, however, are often generated on the fly in response to a client issued request. Dynamic web pages are often found in applications that need to respond to specific customer requests such as a query.

One example of an application where dynamic web pages are typically generated is a search request for locating information within an organization's web server or on another host on the Internet. Providing a static search page for every possible combination of terms may be either impossible or impractical. The search engine dynamically generates a web page in response to customer supplied search terms.

Dynamically generated web pages are typically found in any application where the customer is likely to need customer specific information such as account information. For example, dynamic web pages might be generated in response to a customer's query into current status of an order, banking transactions, account balances, etc. Generally dynamic web pages are advantageous for servicing customer requests when creating static web pages for every possible query would be impossible or impractical.

With respect to enabling collaboration (i.e., accessing the same resource such as viewing the same web page) between the client and the agent, one method is to pass the URL for the resource accessed by one party to the other party. Thus for example, when the customer changes web pages the URL for the new web page can be sent to the agent. The agent can then access the web page using the same URL. This technique is referred to as "URL sharing." Generally URL sharing accommodates synchronization between the customer and the agent when static resources (e.g., static web pages) are being viewed. URL sharing is not desirable in some situations, however. In particular, URL sharing may not be appropriate for some dynamic resources such as dynamically generated pages.

In one embodiment, the customer accesses the server using the Hypertext Transfer Protocol (HTTP). Generally any request to a host or server is referred to as a client request regardless of the source of the request. Examples of HTTP client request protocols can be found in T. Berners-Lee, et al., *RFC 1945 Hypertext Transfer Protocol—HTTP/1.0* (May 1996) and R. Fielding, et al., *RFC 2068 Hypertext Transfer Protocol—HTTP/1.1*, (January 1997).

URL sharing may be undesirable or impossible if the customer request includes information that is not or should not be readily available to the agent. An HTTP client request includes a method or command that describes the action to be taken on the URL by the server. One such method is the POST method. The POST method enables a customer-client to communicate additional information other than the URL to the server. This additional information, however, is not readily accessible by a third party such as the agent. Moreover, even if the information were accessible, the customer may prefer that the information not be available to the agent for some applications (e.g., confidential financial transactions). Thus URL sharing alone would not enable the agent to retrieve the same page as the customer because the data necessary for dynamically generating the page is unavailable to the agent.

Another application where URL sharing may be undesirable is when servicing the client's request results in some action other than merely displaying the web page. For example, another method supported by HTTP is the GET method. Unlike the POST method, any special information regarding the request is embedded in the URL. For example, in a search engine application the URL typically includes the search string defining the search parameters. Sharing the URL with the agent is harmless because repeating the search has no undesirable side effects. In other applications the agent's issuing of the URL may result in undesirable actions.

For example, in an online banking application, the customer's account number and specific transactions to be performed may be embedded within the URL. When the customer issues the request, the customer's URL may result in a withdrawal, transfer, deposit or other action on the customer's account. URL sharing in this case would be inappropriate because undesirable side effects (e.g., unintended banking transactions) would occur if the agent issued a request with the same URL.

Accordingly, in one embodiment, a cache is provided to cache web pages accessed by the customer. The agent is provided with a modified URL identifying the cached web page rather than the original web page.

Figure 11:
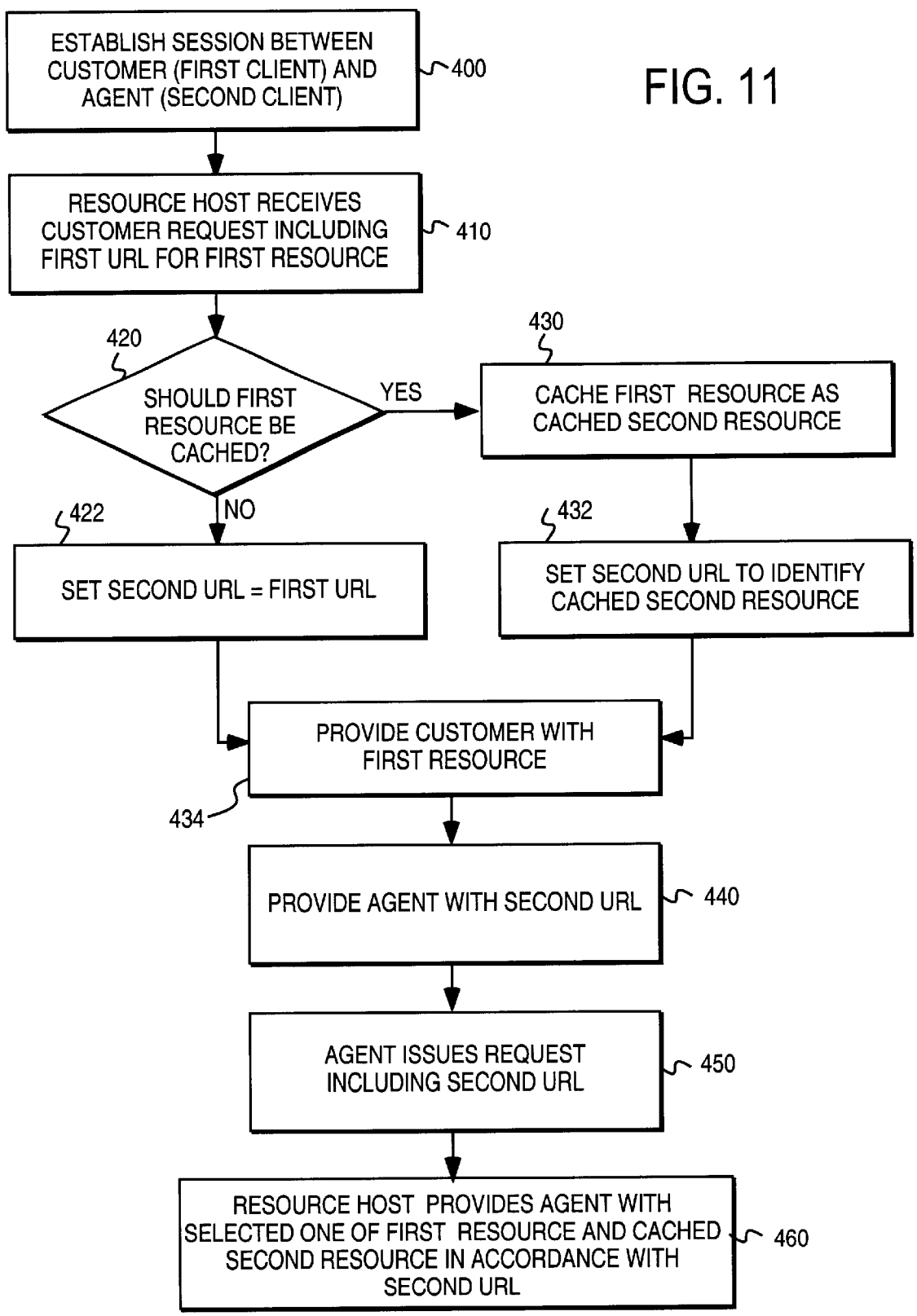
FIG. 11 illustrates a method to enable dynamic resource collaboration between an agent and a customer.

FIG. 11 illustrates a flowchart for enabling dynamic resource collaboration or sharing when the session host and the resource host (e.g., web server) are effectively the same.

Presumably a collaboration session has already been established between a customer (i.e., first client) and an agent (i.e., second client) as indicated in step 400. In step 410 the session/resource host receives a customer request including a first URL identifying a first resource such as a web page. Step 420 determines if the requested first resource should be cached for the agent. Referring to FIG. 2, filter service 68 determines if the first resource requested by the customer should be cached in cache 82 for subsequent access by the agent. If so, the first resource is cached in step 430 as a cached second resource.

A second URL is defined for the agent. The second URL is the same as the first URL if the first web page is not cached (step 422). If the first resource is cached then the second URL is set to identify the cached second resource in step 432.

The customer is then provided with the first resource in step 434. In step 440, the agent is provided with the second URL. The agent may issue a request including the second URL in step 450. In response, the session/resource host provides the agent with a selected one of the first resource and the cached second resource in accordance with the second URL in step 460. As long as the customer-agent session is active, steps 410–460 can be repeated each time the customer issues another request.

Generally the entity responsible for web server 66 will be aware of the rules that define when the agent should be referencing a cached web page instead of attempting to retrieve a resource such as a web page through URL sharing. These rules may be implemented in step 420 of FIG. 11 to define whether the web page should be cached.

For example, web pages that should be cached may be identified by a particular characteristic of the web page's associated filename on the web server. The filename extension "ASP" (Active Server Page) for example often identifies a dynamic web page. Step 420 may determine that all dynamic web pages should be cached unless they can be re-generated by the agent without undesirable effects.

In another example, the expiration-date of the resource (e.g., web page) returned by the server may indicate whether the resource should be cached. In one embodiment, step 400 determines that a resource should be cached if the expiration date of the fetched resource indicates that the resource has expired or will expire in the near future. In one embodiment, the resource is a web page.

The expiration date is often used to control whether a cached version of the web page can be used for the client when the client re-visits the web page in order to substantially eliminate download times. In the present case, however, an expiration date indicating that a cached version of the resource should not be relied upon by the client customer is an indication that the resource is a dynamic resource subject to change. Thus such resources should be cached by the filter service 68 into cache 82 in step 430 to enable the agent to access the same version of the resource as the customer.

The rules implemented by step 420 may result in caching any resource resulting from a client request containing a method other than GET. For example, in one embodiment a web page generated as the result of a client request is cached if the customer request includes at least a selected one of a PUT, DELETE, LINK, or UNLINK HTTP method. In order to ensure no adverse affects, the requested web page may be cached in every circumstance. Selective caching, however, may result in greater resource utilization efficiency.

Referring to step 440, the appropriate URL may be provided to the agent's browser by the customer's browser. In one embodiment, web pages retrieved from web server 66 have the URL to be used by the agent embedded within them. This URL may then be communicated to the agent automatically by the customer's browser application. In one embodiment, the embedded URL is the same as the customer's when the web page is not cached in cache 82. Filter services 62, however, embeds a modified URL identifying the cached version of the web page whenever the web page is cached.

The procedure above is particularly suited for situations where the resource host and the session host are the same or are managed by the same entity. In such a case the requested web pages are readily available to cache. Moreover the decision whether to cache the resources may be predetermined by providing the embedded URLs in the web pages at the time the web pages are created.

In some applications, however, the resource host and the session host may need to be distinct. For example, a company may outsource help desk operations to a third party. The third party may not have access to the corporate resource host and thus may not be able to maintain session control if the customer is permitted to freely navigate the corporate resource host or other hosts on the Internet. In particular, the mechanism for caching the dynamic resources resides with the session host as opposed to the resource host and thus the agent has no means of ensuring access to the same resources provided by the resource host directly to the client customer.

Figure 12:
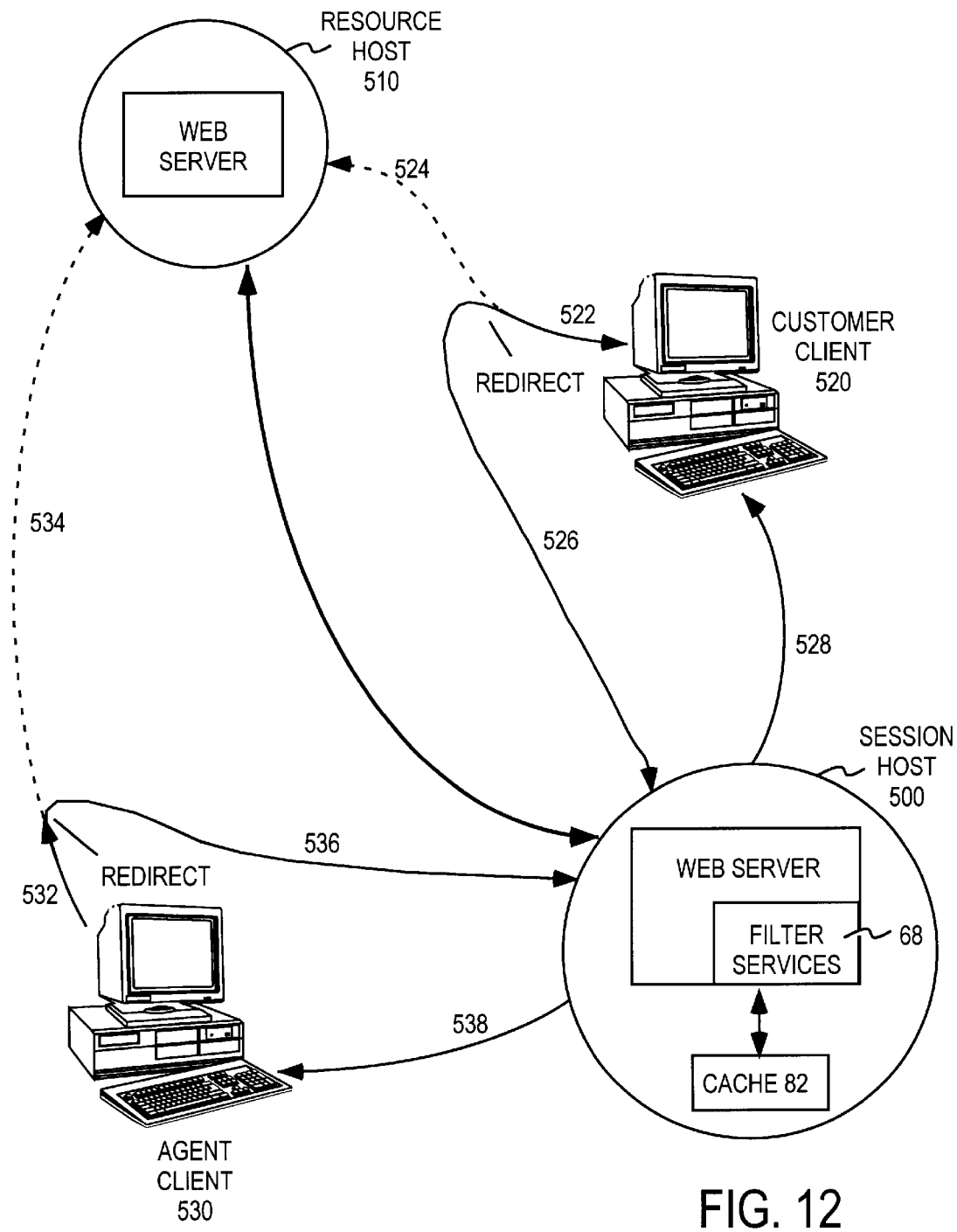
FIG. 12 illustrates a transaction processing environment having a session management host distinct from a resource host.

FIG. 12 illustrates an embodiment where the session host 500 and the server or resource host 510 are distinct entities.

Ordinarily, a customer client request 522 designating the resource host 510 would result in customer client 520 accessing the resource host 510 independently of session host 500 as indicated by 524. Similarly, an agent client request 532 designating the resource host 510 would result in agent client 530 accessing the resource host 510 independently of session host 500 as indicated by 534. These independent accesses, however, ensure that the session host 500 is unable to cache any dynamic resources resulting from such requests. Resource host 510 treats agent client 530 and customer client 520 as distinct entities and manages requests between the customer and the agent independently. As a result, the other party to the session might not have access to dynamic resources specific to the other party's session.

In order to ensure that all parties collaborating during the session can access the same resource, client requests are re-directed through the session host effectively causing the session host to issue the request. Thus, for example, customer client requests (e.g., 522) identifying a host (510) other than the session host 500 are re-directed through session host 500 as indicated by 526. Similarly, agent client requests (e.g., 532) identifying a host (510) other than session host 500 are re-directed through session host 500 as indicated by 536.

Figure 13:
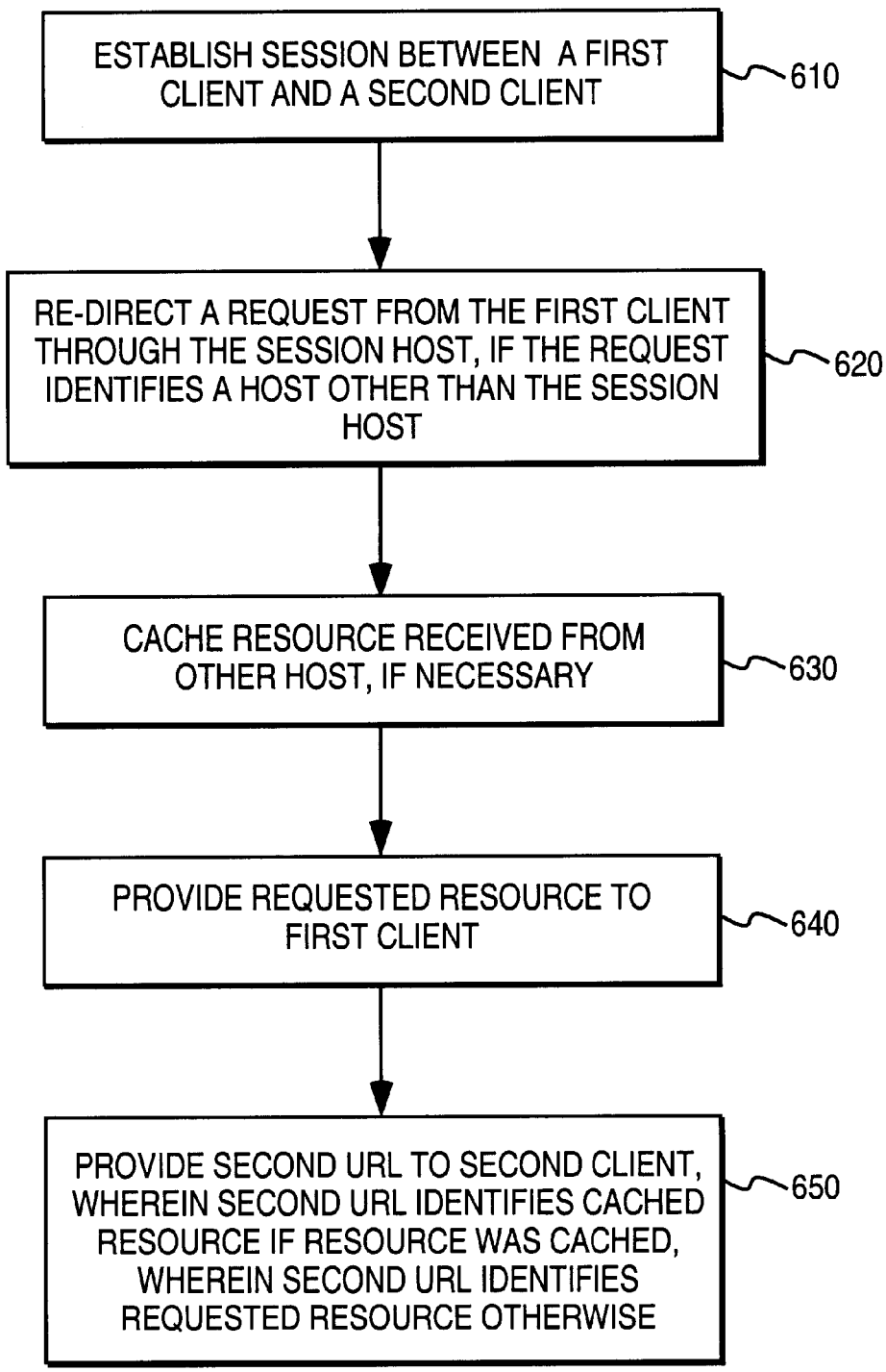
FIG. 13 illustrates a method of dynamic resource collaboration when the session host is distinct from the resource host.

FIG. 13 illustrates one embodiment of a method of redirecting customer and agent client requests through the session host to ensure the ability to cache dynamic resources so that the agent and the customer can URL share the same resource.

In step 610, a collaboration session is established between a first client (e.g., customer) and a second client (e.g., agent). Referring to FIG. 12, a session between customer client 520 and agent client 530 is established on session host 500 in one embodiment. In step 620, a request identifying a host other than the session host from the first client is redirected to force the request to be issued by the session host 500.

Re-direction can be accomplished by conditionally modifying a request's URL. For example, if a client initiates a request containing a first URL identifying a resource from a host other than the session host, the first URL is modified to create a modified URL that re-directs the request through the session host. This may be accomplished, for example, by execution of a Java application in conjunction with the customer's browser during an agent15 customer collaboration session. Such a client re-direction application may include JavaScripts for trapping requests for hosts other than the session host and Java applets for generating the modified URLs. In one embodiment, the modified URL is formed by concatenating the identity of the session host with a redirection command (e.g., "redirect?") and the first URL.

The redirected request results in having the session host issue a request for the resource identified by the first URL. In step 630, the session host then caches the resource received in response to the re-directed request, if necessary. The conditions for caching may be the same as those previously described in reference to FIG. 11. The session host then responds to the first client's request by providing the received resource to the first client in step 640. The second client is provided with a second URL in step 650. In one embodiment, the second URL is the same as the first URL if caching is not necessary. The second URL identifies the cached resource if the resource was cached. The agent may then access the appropriate resource using the second URL provided in step 650.

Referring to step 650, the second URL may be provided to the second client's browser by the first client's browser.

In one embodiment, the session host 500 embeds the second URL to be used by the second client into the requested resource. The embedded URL may then be communicated to the second client automatically by the first client's browser application during a collaboration session.

In one embodiment the filter services of the session host handles caching. Thus, referring to FIGS. 12 and 13, filter services 68 determines whether a retrieved resource should be cached (step 630), and if so, caches the modified resource in cache 82.

Figure 14:
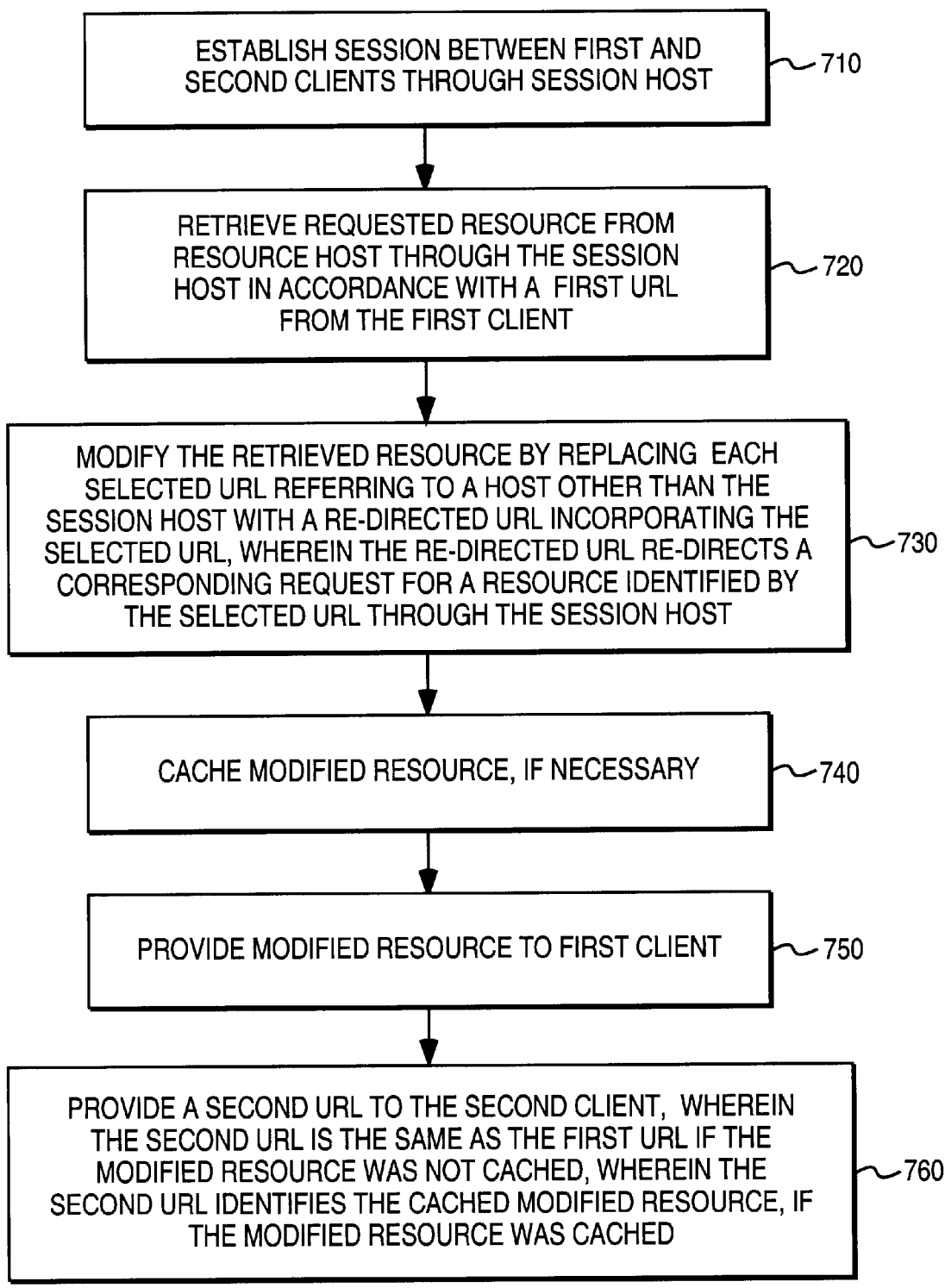
FIG. 14 illustrates an alternative method of dynamic resource collaboration when the session host is distinct from the resource host.

The security architecture of a browser application may not permit simple re-direction of a client request without the co-operation of the other host. Thus re-direction may not be possible through the use of a Java application when the security architecture of the browser is adhered to. Thus an alternative method for achieving the re-direction is illustrated in FIG. 14.

In step 710 a collaboration session between a first client and a second client is established through the session host. This may be performed, for example, in response to selection of the "HELP" button as described above. During the session, all requests are re-directed through the session host by modifying the URLs contained within any retrieved resources. In response to initiation of a session, the session host might provide the customer (e.g., first client) with a web page having links containing indirect references to resource hosts other than the session host. In step 720 a requested resource is retrieved from a resource host through the session host in accordance with a first URL from the first client. The first URL provides an indirect reference to the resource host by re-direction through the session host. The retrieved resource is not yet provided to the requesting client.

In step 730, the session host modifies each URL referring to a host other than the session host within the retrieved resource to ensure that the modified URL re-directs the corresponding request through the session host. Thus any reference or link defining a client request to a host other than a session host is modified to re-direct the request through the session host. In one embodiment this is accomplished by concatenating the name of the session host and a re-direction command to the selected URL.

The session host determines whether to cache the modified resource in step 740. As discussed above, the rules defining whether a resource should be cached may be varied according to the particular needs of the client-agent session. Dynamic resources such as dynamic web pages typically need to be cached to ensure availability to the other party. Characteristics indicative of dynamic resources include a pre-determined filename extension, a retrieved resource expiration date, or even the command used to retrieve the resource (e.g., "POST" command).

In step 750, the modified resource is provided to the requesting client. If, for example, the resource is a web page, the web page will be displayed by the requesting client's browser application. In the event that the client now selects a hyperlink from the web page, the modified URL associated with the hyperlink will designate a re-direction operation to ensure that the original request associated with the hyperlink is now re-directed through the session host. Thus, no modification is required at the client's end to modify URLs. Similarly, no co-operation is required from the resource host in accordance with the security architecture.

The second client (e.g., the agent) is provided with a second URL in step 760. If the modified resource was cached the URL indicates the cached version of the modified resource stored in the session host cache. Otherwise the second URL corresponds to the first URL to ensure that any command acting upon the second URL is effectively carried out by the session host.

The second client may use the second URL to retrieve the same resource accessed by the first client. For example, the second client may issue a request comprised of a GET command and the second URL. The resource will be retrieved either from the session host cache or from the other host via re-direction through the session host in accordance with the second URL.

Referring to FIGS. 12 and 14, step 730 is performed by filter services 68 in one embodiment. In addition, filter services 68 determines whether a modified retrieved resource should be cached (step 740), and if so, caches the modified resource in cache 82.

Although the examples presented above illustrate requests initiated by one client (e.g., a customer), the roles of customers and agents in the examples may be interchanged to enable collaboration of a particular resource to be initiated by either party. Thus, for example, "first" and "second" client could refer to agents or customers interchangeably.

Figure 15:
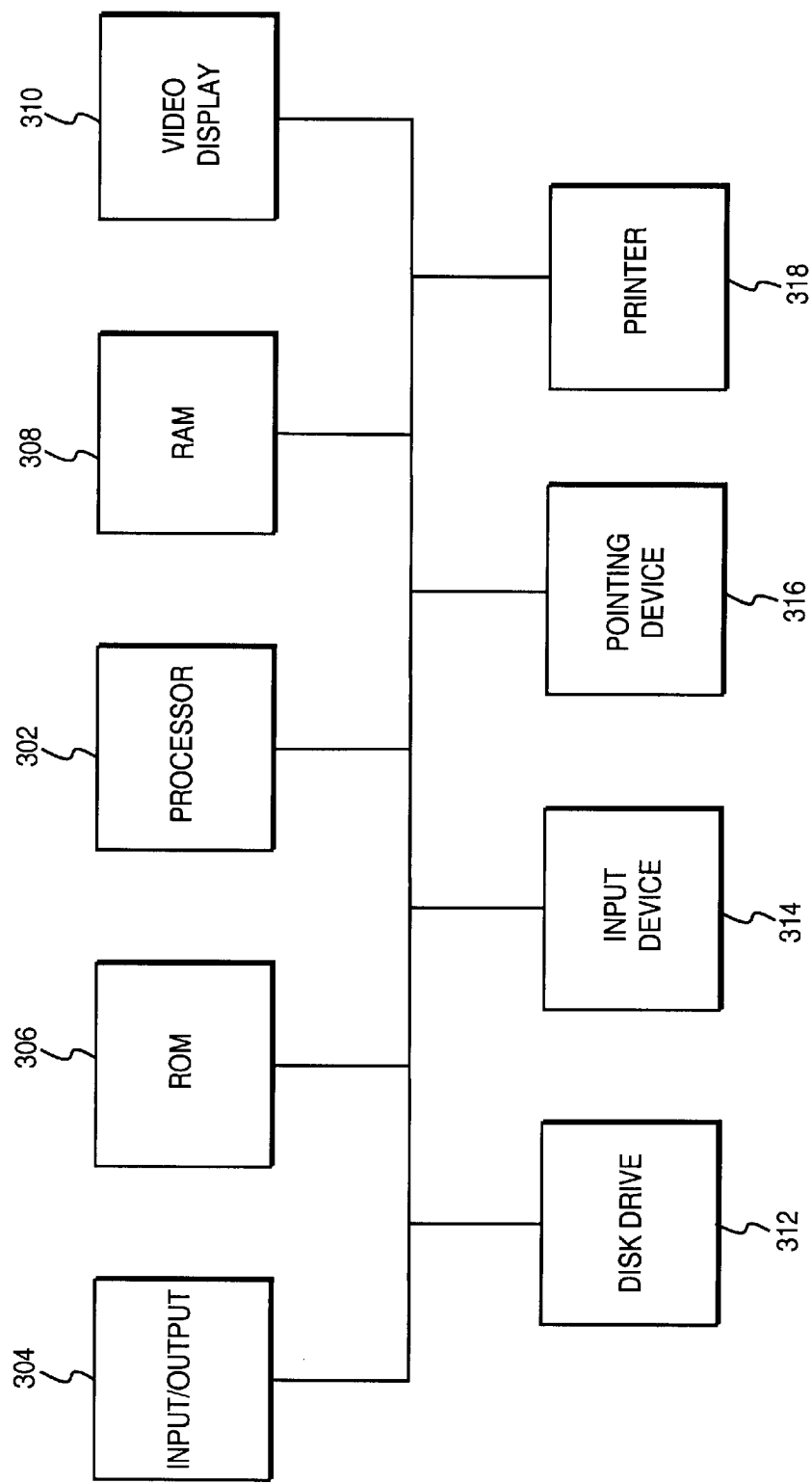
FIG. 15 illustrates an embodiment of a computer system that can be used with the present invention.

FIG. 15 illustrates an embodiment of a computer system that can be used with the present invention. For example, embodiments of the invention may use a computer of the type shown in FIG. 15 for an agent's computer, a customer's computer, a server, a transaction processing system, or any other device contained in or used with the transaction processing environment discussed above. The various components in FIG. 15 are provided by way of example. Certain components of the computer in FIG. 15 can be deleted for particular implementations of the invention. The computer system shown in FIG. 15 may be any type of computer, including a general purpose computer.

FIG. 15 illustrates a system bus 300 to which various components and devices are coupled. A processor 302 performs the processing tasks required by the computer. Processor 302 may be any type of processing device capable of implementing the steps necessary to perform the various procedures and operations discussed above. An Input/Output (I/O) device 304 is coupled to bus 300 and provides a mechanism for communicating with other devices coupled to the computer. A Read-Only Memory (ROM) 306 and a Random Access Memory (RAM) 308 are coupled to bus 300 and provide a storage mechanism for various data and information used by the computer. Although ROM 306 and RAM 308 are shown coupled to bus 300, in alternate embodiments, ROM 306 and RAM 308 are coupled directly to processor 302 or coupled to a dedicated memory bus (not shown).

A video display 310 is coupled to bus 300 and displays various information and data to the user of the computer. A disk drive 312 is coupled to bus 300 and provides a mechanism for the long-term mass storage of information. An input device 314 and a pointing device 316 are also coupled to bus 300 and allow the user of the computer to enter information and commands to the computer system. Input device 314 may be, for example, a keyboard, keypad, handwriting recognition device, or voice recognition device. Pointing device 316 includes, for example, a mouse, track ball, or touch pad. A printer 318 is coupled to bus 300 and is capable of creating a hard copy of information generated by or used by the computer.

Embodiments of the present invention may be implemented using a computer-readable medium (also referred to as a processor-readable medium) containing various sets of instructions, code sequences, configuration information, and other data used by a computer or other processing device. The various information stored on the computer-readable medium is used to perform various data communication, data processing, and data handling operations, such as those described above. The computer-readable medium may be any type of magnetic, optical, or electrical storage medium including a diskette, magnetic tape, CD-ROM, memory device, or other storage medium. In one embodiment, for example, a set of instructions forming a client redirection program can be distributed in such a storage medium with or independently of a browser application. When executed in conjunction with a browser application of a first client, the re-direction program communicates with the browser application. During a collaboration session between the first client and a second client through a session host, the re-direction program issues a re-direction request in response to a selected first client request having a uniform resource locator (URL) identifying a host other than the session host. The re-direction request incorporates the first request, wherein the re-direction request causes the session host to issue the selected request.

In the preceding detailed description, the invention is described with reference to specific exemplary embodiments thereof. Various modifications and changes may be made thereto without departing from the broader spirit and scope of the invention as set forth in the claims. The specification and drawings are, accordingly, to be regarded in an illustrative rather than a restrictive sense.

What is claimed is:

1. A method comprising the steps of:
   a) establishing a collaboration session between a first client and a second client with a session host;
   b) re-directing a first client request having a first uniform resource locator (URL) through the session host, if the first URL identifies a host other than the session host; and
   c) caching a resource retrieved by the session host in response to the re-directed request as a cached resource at the session host, if at least one of the first request and the retrieved resource has a pre-determined characteristic.

2. The method of claim 1 wherein the cached resource is a dynamic web page.

3. The method of claim 1 wherein the retrieved resource is cached if the first request includes at least one of a POST, PUT, DELETE, LINK, HEAD, and an UNLINK hypertext transfer protocol (HTTP) command.

4. The method of claim 1 wherein the retrieved resource is cached if an expiration date of the retrieved resource indicates that the retrieved resource is dynamic.

5. The method of claim 1 further comprising the step of:
   d) providing the retrieved resource to the first client.

6. The method of claim 5 wherein step d) further comprises the step of:
   i) embedding a second URL in the retrieved resource before providing the retrieved resource to the first client, wherein the second URL is the same as the first URL if the retrieved resource is not cached, wherein the second URL identifies the cached resource if the retrieved resource is cached.

7. The method of claim 6 wherein a browser application of the first client generates the first client request, wherein a first client re-direction application modifies the first client request to re-direct the first client request through the session host if the first URL identifies a host other than the session host, wherein the first client browser application communicates the second URL to a browser application of the second client.

8. The method of claim 1 further comprising the step of:
d) providing the second client with a second URL, wherein the second URL is the same as the first URL if the retrieved resource is not cached, wherein the second URL identifies the cached resource if the retrieved resource is cached.

9. The method of claim 1 wherein step b) further comprises the steps of modifying the first client request to form a second URL incorporating the first client request, wherein the second URL redirects the first client request including the first URL through the session host.

10. An apparatus comprising storage medium storing instructions forming a client re-direction application, wherein when executed in conjunction with a browser application of a first client, the client re-direction application communicates with the browser application, wherein during a collaboration session between the first client and a second client through a session host, the client re-direction application issues a re-direction request in response to a selected first client request having a uniform resource locator (URL) identifying a host other than the session host, wherein the re-direction request incorporates the first request, wherein the re-direction request causes the session host to issue the selected first client requests wherein the session host caches a retrieved resource if one of the retrieved resource and the URL has a pre-determined characteristic identified by the stored instructions.

11. An apparatus comprising a browser application including a re-direction application for establishing a collaboration session through a session host, wherein in response to a selected request to access a host other than the session host, the re-direction application re-directs the selected request through the session host, wherein the session host caches a retrieved resource if one of the retrieved resource and selected request has a predetermined characteristic.

12. A method comprising the steps of:
a) establishing a collaboration session between a first client and a second client with a session host; and
b) retrieving a requested resource from a resource host to a session host in response to a first client request having a first uniform resource locator (URL), if the first URL identifies a resource host other than the session host; and
c) modifying the retrieved resource, wherein for each embedded request identifying a host other than the session host an associated embedded URL of the embedded request is replaced with a re-directed URL incorporating the embedded URL, wherein the re-directed URL re-directs the corresponding request for a resource identified by the embedded URL through the session host.

13. The method of claim 12 further comprising the step of:
d) caching the modified resource if at least one of the first request and the retrieved resource has a specified characteristic.

14. The method of claim 13 wherein the modified resource is cached if the retrieved resource is a dynamic resource.

15. The method of claim 14 wherein an expiration date of the retrieved resource indicates whether the retrieved resource is a dynamic resource.

16. The method of claim 14 wherein the modified resource is cached if the retrieved resource is associated with a filename having a selected characteristic.

17. The method of claim 13 wherein the modified resource is cached if the first request includes at least one of a POST, PUT, DELETE, LINK, and an UNLINK hypertext transfer protocol (HTTP) command.

18. The method of claim 13 further comprising the step of:
e) providing the modified resource to the first client.

19. The method of claim 18 wherein steps c)–e) are performed by the session host.

20. The method of claim 18 further comprising the step of:
f) providing a second URL to the second client, wherein the second URL identifies the cached modified resource if the modified resource was cached, wherein the second URL is the same as the first URL if the modified resource was not cached.

* * * * *